United States Patent [19]

Petersen et al.

[11] Patent Number: 5,319,752
[45] Date of Patent: Jun. 7, 1994

[54] DEVICE WITH HOST INDICATION COMBINATION

[75] Inventors: Brian Petersen, Los Altos; Lai-Chin Lo, Campbell, both of Calif.

[73] Assignee: 3Com Corporation, Santa Clara, Calif.

[21] Appl. No.: 947,773

[22] Filed: Sep. 18, 1992

[51] Int. Cl.⁵ ............................................. G06F 13/14
[52] U.S. Cl. .................................... 395/250; 395/200
[58] Field of Search ............................. 395/200, 250; 364/239.4, 251.3, 938.2; 370/13.1, 17, 82, 83; 371/5.3, 20.1, 20.4, 22.1, 24, 37.9, 67.1, 71

[56] References Cited

U.S. PATENT DOCUMENTS

| | | | |
|---|---|---|---|
| 4,546,467 | 10/1985 | Yamamoto | 370/13 |
| 4,680,581 | 7/1987 | Kospik et al. | 370/85 |
| 4,866,666 | 9/1989 | Francisco | 364/900 |
| 5,101,402 | 3/1992 | Chiu et al. | 370/17 |
| 5,103,446 | 4/1992 | Fischer | 370/85.1 |

Primary Examiner—Dale M. Shaw
Assistant Examiner—Moustafa M. Meky
Attorney, Agent, or Firm—Haynes & Davis

[57] ABSTRACT

Combined indication signals of data block transfers are generated by a device which reduces the number of interrupts to a host processor. The reduction in the number of interrupts enhances host system performance during data block transfers. An embodiment of the device may be a network adapter comprising network interface logic for transferring a data frame between a network and a buffer memory and host interface logic for transferring a data frame between a buffer memory and a host system. The network adapter further includes threshold logic for generating an early receive indication signal when a portion of the data frame is received. Indication combination logic delays the generation of a transfer complete interrupt to slightly before the expected occurrence of the early receive indication. The host processor is able to service both the transfer complete indication and the early receive indication in a single interrupt service routine caused by the transfer complete indication.

28 Claims, 19 Drawing Sheets

FIG.—1

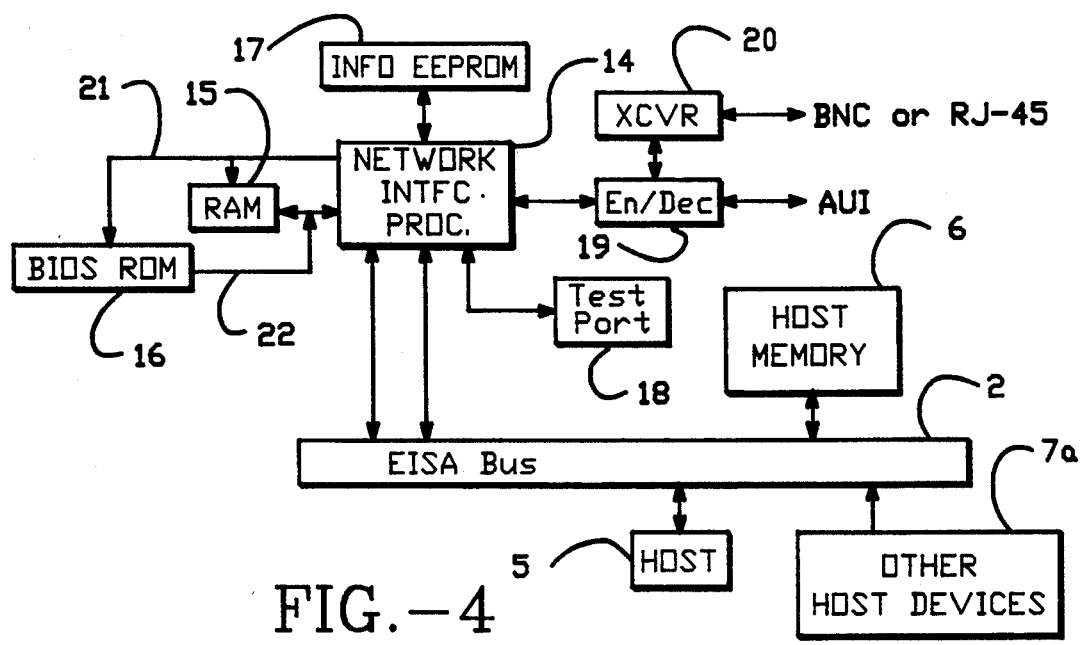
FIG.—4
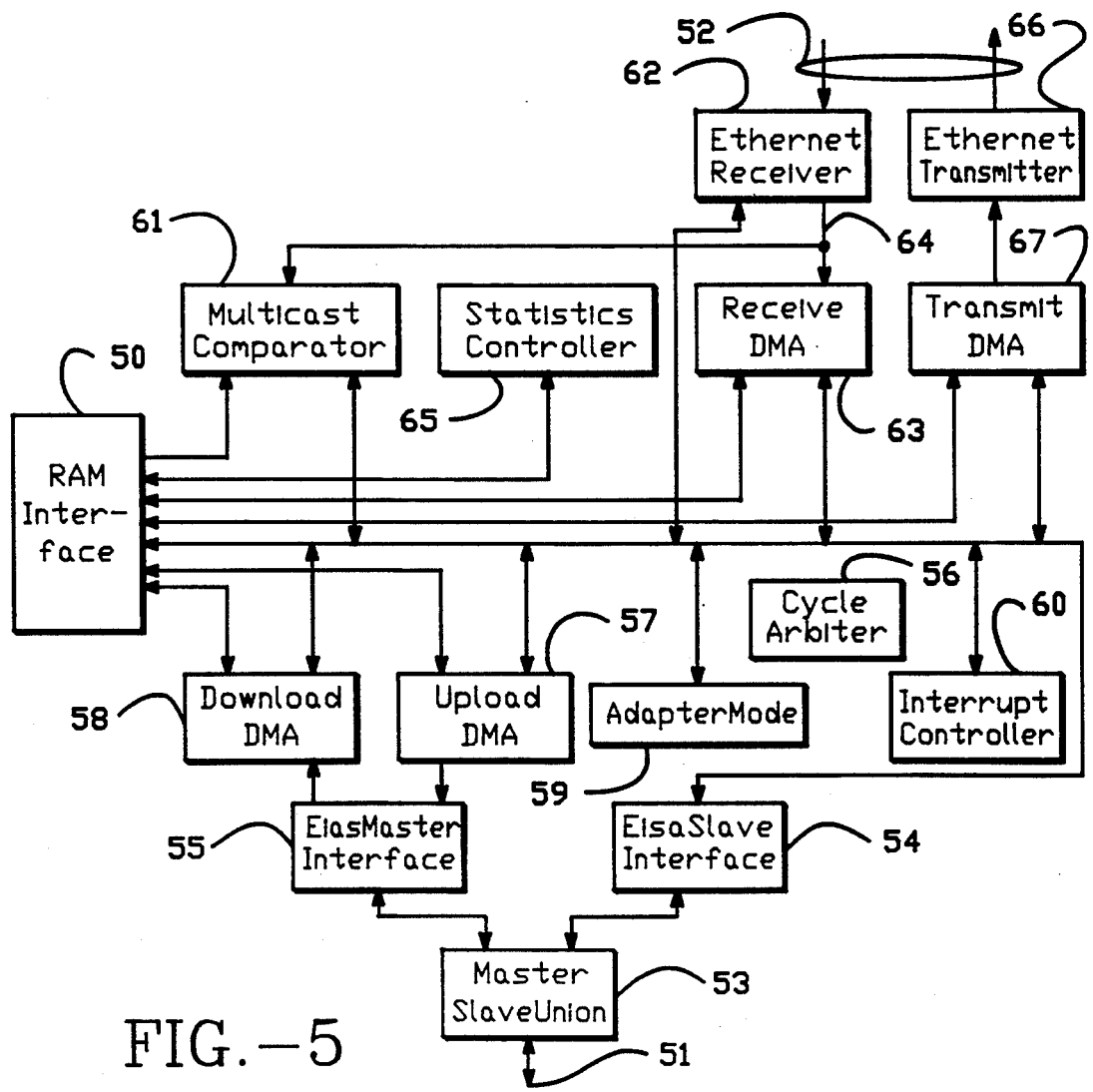
FIG.—5

| base address | | size |
|---|---|---|
| 0x0 | Transmit Data Buffer | 3K |
| 0xc00 | Transmit Descriptors | 5K |
| 0x2000 | Reveice Buffer | 22K |
| 0x7800 | Transfer Descriptor | 1K |
| 0x7c00 | AdapterInfo Data | 256 |
| 0x7d00 | Network Statistics | 196 |
| 0x7e00 | Muticast Address Table | 96 |

Adapter RAM Memory Map

FIG.—8

| 31 | 16 | 15 | 0 | Offset |
|---|---|---|---|---|
| \multicolumn{4}{c\|}{NextDescriptorPointer} | 0x0 |
| \multicolumn{4}{c\|}{XmitFailure} | 0x4 |
| \multicolumn{4}{c\|}{FrameLength} | 0x8 |
| XmitReqHandle | | XmitStatus | | 0xc |
| XmitProtId | | MACID | | 0x10 |
| XmitBufferCount | | XmitImmedLen | | 0x14 |
| \multicolumn{4}{c\|}{Immediate Data} | 0x18 |
| XmitDataLen | | 0 | | ↑ repeated |
| \multicolumn{4}{c\|}{XmitDataPtr} | XmitBufferCount times ↓ |

FIG.—9a

| 31 | 16 | 15 | 0 | Offset |
|---|---|---|---|---|
| \multicolumn{4}{c\|}{reserved} | 0x0 |
| TDOffset | | TDBufferCount | | 0x4 |
| TDDataLen | | 0 | | 0x8 |
| \multicolumn{4}{c\|}{TDDataPtr} | | repeated TDBufferCount times

FIG.—9b

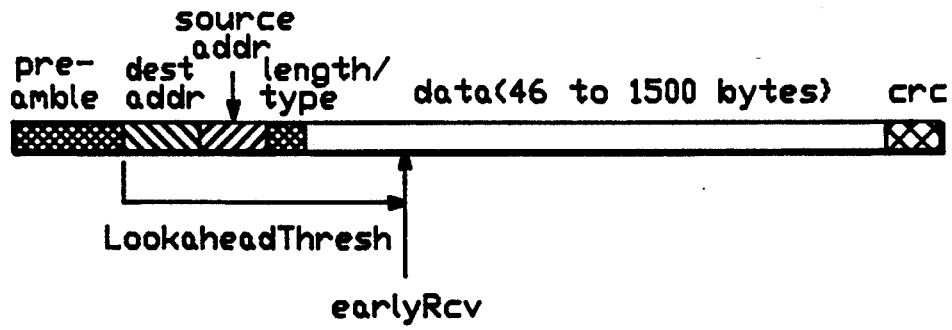
FIG.—13a
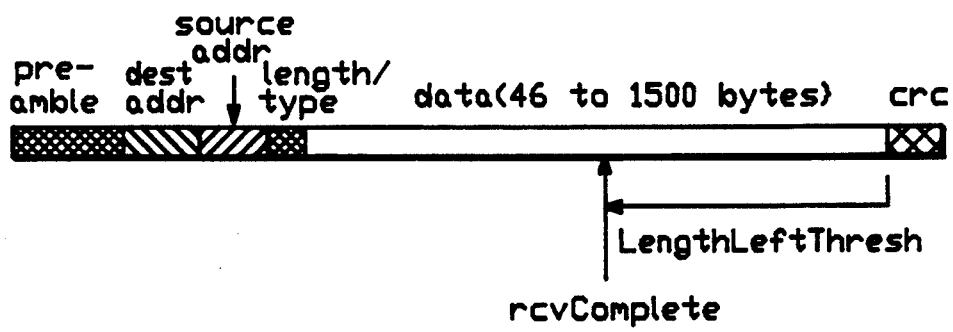
FIG.—13b
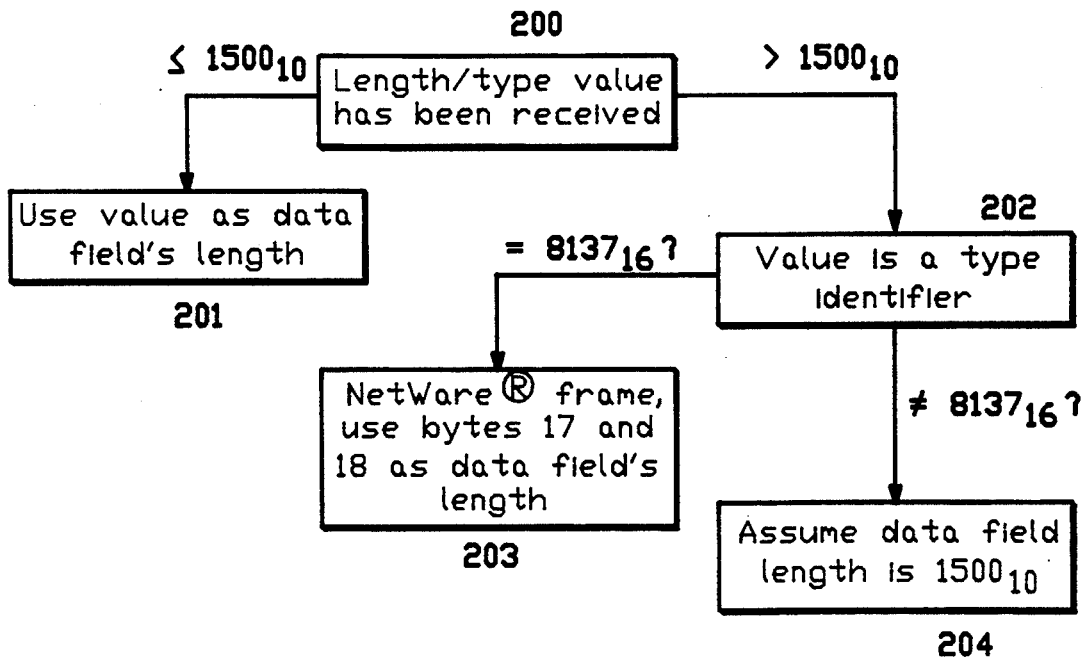
FIG.—14

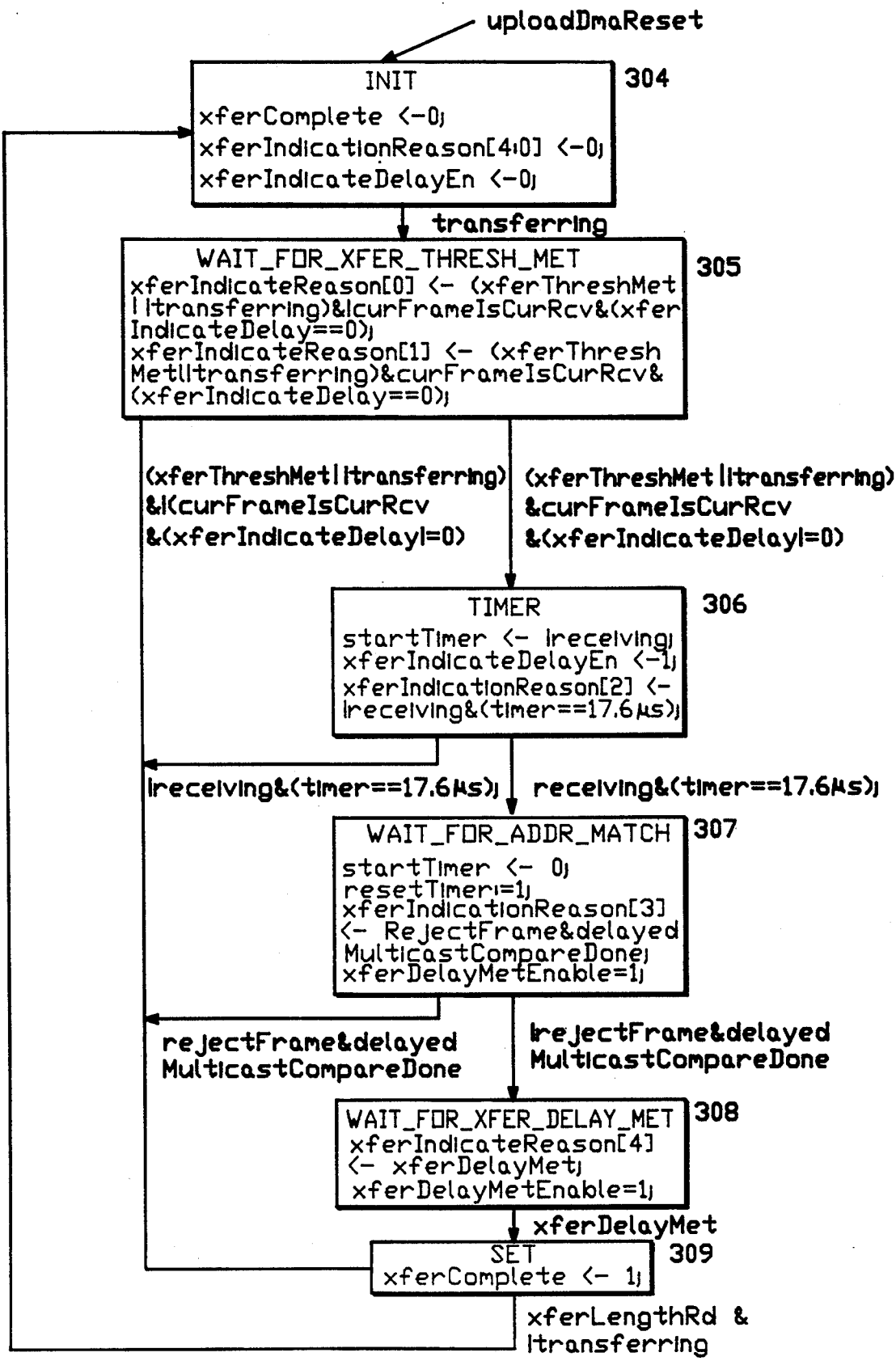
FIG.—21

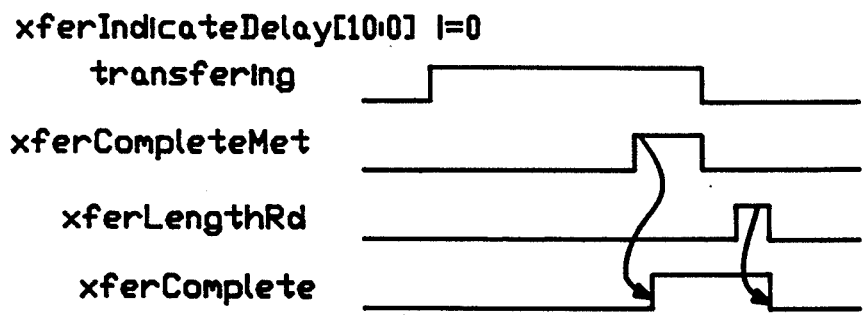
FIG.−22a
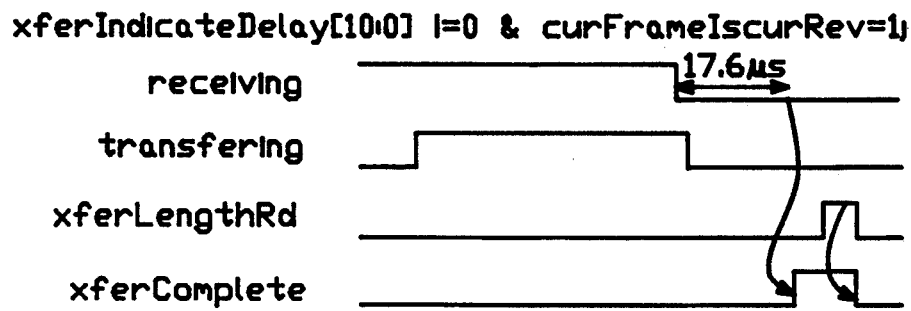
FIG.−22b
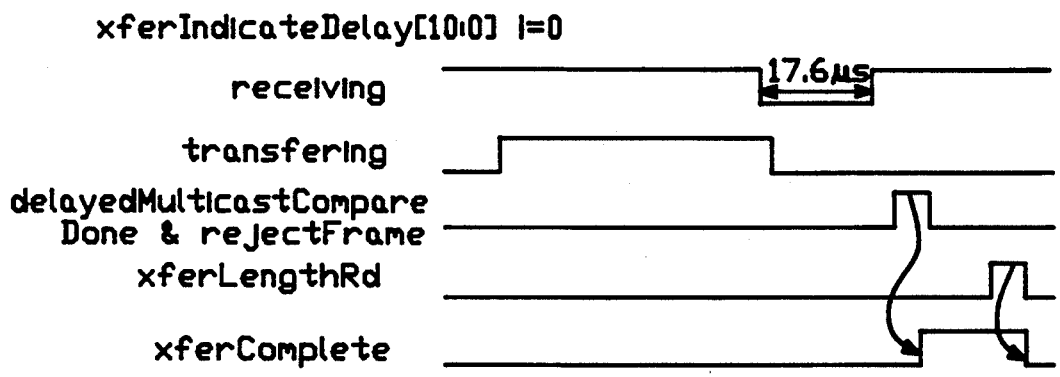
FIG.−22c
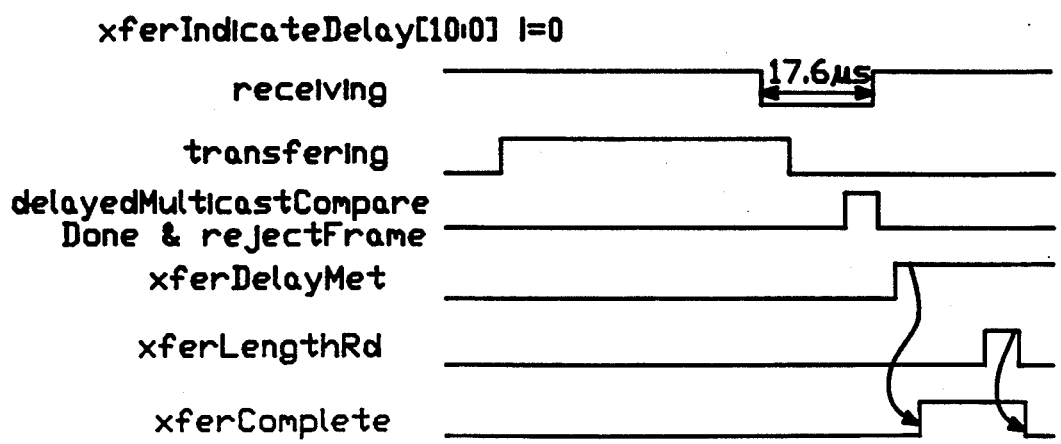
FIG.−22d

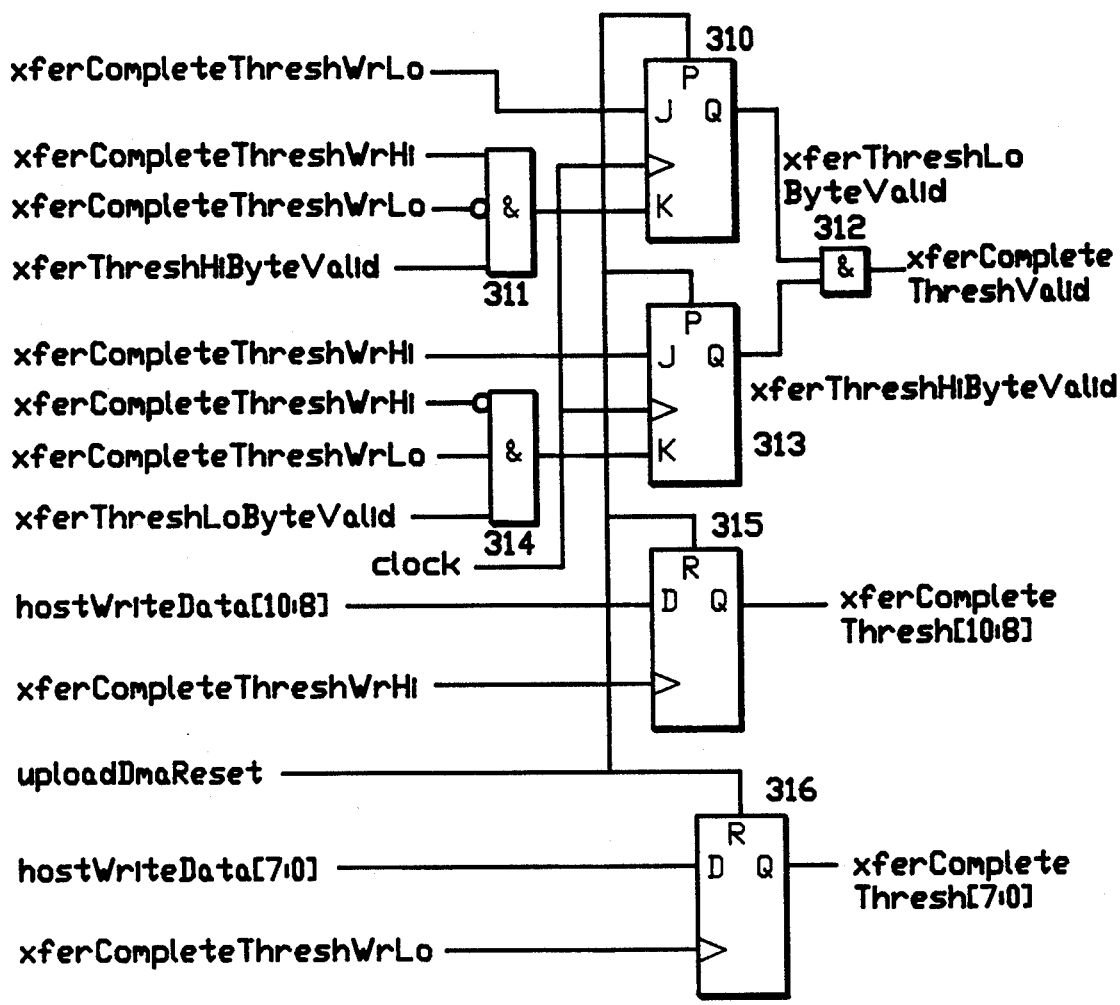
FIG.—23
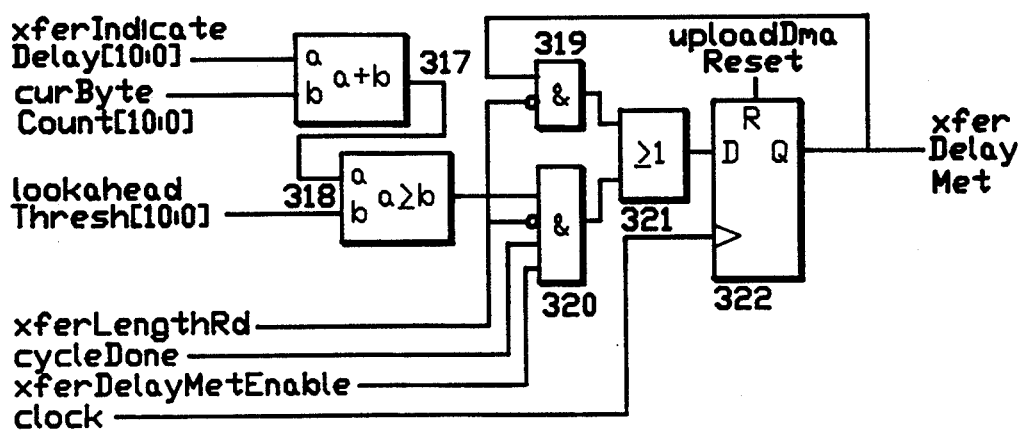
FIG.—24

DEVICE WITH HOST INDICATION COMBINATION

CROSS-REFERENCE TO RELATED APPLICATIONS

The present application is related to co-pending U.S. patent application entitled NETWORK ADAPTER WITH HOST INDICATION OPTIMIZATION, Ser. No. 07/920,898, filed Jul. 28, 1992, which was owned at the time of invention and is currently owned by the same assignee.

BACKGROUND OF THE INVENTION

1. Field of the Invention

The present invention relates to the transfer of data blocks from a source device to a destination device, and particularly to combining transfer indications to a host processor.

2. Description of Related Art

Typically, when a data block is transferred from a source device to a destination device on a data bus in a host system at least two indication signals are generated. The source device generates the indication signals to a host processor describing the status of the transfer. A first indication signal is generated which may produce an interrupt signal to a host processor when the source device is ready to transfer a block of data to the destination device, such as system memory. The host processor then will respond to the interrupt signal by saving its system parameters and entering its interrupt service routine. However, saving the host processor's system parameters and entering an interrupt service routine degrades system performance. Not only is the host processor unable to carry out other functions during this state of operation, the saving of system parameters takes a relatively long period of time. For example, the saving of system parameters in an OS/2 operating system may take as long as 30 microseconds.

During the interrupt service routine of the host processor, a determination will be made as to which device on the data bus generated the interrupt and what service is required. In the case that the interrupt was generated by a source device which needs to transfer a block of data to a destination device, the host processor will initiate the transfer to the destination device. The host processor will then exit the interrupt service routine and continue its previous state of operation.

The second indication signal generated by the source device occurs when the transfer of a block of data is complete. This second indication signal also may generate a second interrupt to the host processor. Once again, system performance is slowed by the host processor entering its interrupt service routine for the second time and determining the cause of the interrupt and servicing the interrupt.

Generally two indication signals generate two interrupt signals to a host processor when a single block of data is transferred with each interrupt signal reducing system performance. The first interrupt is generated when a block of data is ready for transfer, and the second interrupt is generated when the transfer of the block of data is complete.

Moreover, interrupts generated by a transfer of one block of data may occur relatively close in time to the interrupts generated by the availability of a second block of data. The second interrupt generated by the first data block transfer complete indication may occur right before a first interrupt of a second block of data generated by a ready for transfer indication. Both interrupts occurring in a relatively short period of time cause the host processor to enter back-to-back interrupt service routines.

Therefore, it is desirable to provide a device which combines indication signals to the host processor for both the ready for transfer of a second block of data and the completion of transfer of the first block of data in a single interrupt. The combining of indication signals would reduce the number of interrupts generated to the host processor during the transfer of blocks of data allowing for optimized host system performance and in particular host processor performance.

SUMMARY OF THE INVENTION

The present invention provides for a source device for combining indications of the transfer of data blocks. The device comprises a buffer memory and means for transferring the data blocks from the buffer memory to a destination device. Means for generating a first signal near the end of the transfer of a first data block and means for generating a second signal near the start of the transfer of a second data block are included. Finally, means are provided for delaying the first signal to an expected occurrence of the second signal.

In another aspect of the present invention, the means for generating the second signal includes a counter, coupled to the buffer memory, for counting the amount of data received by the buffer memory. Means for comparing the counter to a ready threshold value in a first alterable storage location generates a second signal responsive to a comparison of the counter and the first alterable storage location containing the ready threshold value.

According to another aspect of the present invention, the means for delaying the first signal includes a second alterable storage location containing a transfer complete delay threshold value. An adder is coupled to the counter and the second alterable storage location which outputs the sum of the values of the counter and the second alterable storage location. A comparator is coupled to the output of the adder and the first alterable storage location generating a first signal responsive to a comparison of the counter in the first alterable storage location containing the ready threshold value.

In yet another aspect of the present invention, an apparatus for transferring a data frame from a network transceiver is the source device which is coupled with a network and a host system which includes a destination device. The apparatus comprises a buffer memory for storing a data frame with network interface logic for receiving the data frame from the network transceiver. Receive threshold logic generates an early receive indication signal responsive to receiving a portion of the data frame. In addition, host interface logic for transferring the data frame from the buffer memory to the host system is provided along with transfer complete logic for generating a transfer complete indication signal responsive to transferring a data frame to the host system. Indication combination logic delaying for a period of time the transfer complete indication signal is also included.

According to another aspect of the present invention, a network adapter for receiving a data frame from a network transceiver to a buffer memory and transferring a data frame from the buffer memory to a host system is provided. The host system includes a host processor and a host memory. The host processor responds to an interrupt and services the network adapter during a period of time. The network adapter comprises network interface logic for receiving a data frame from the network transceiver to the buffer memory. Receive threshold logic generates an early receive indication signal responsive to receiving an amount of the data frame. The receive threshold logic includes a counter coupled to the buffer memory for counting the amount of data received from the buffer memory, and a first alterable storage location containing a receive threshold value. Means for comparing the counter to the receive threshold value in the alterable storage location and generating an indication signal responsive to a comparison of the counter and the alterable storage location is provided. Host interface logic for transferring the data frame from the buffer memory to the host system is also included. Transfer complete logic generates a transfer complete indication signal responsive to transferring a data frame from the host system. Control means generates an interrupt signal to the host processor responsive to the transfer complete indication signal. The control means also posts status information representing the early receive and transfer complete indication signals which may be read by the host processor. Finally, indication combination logic delays the transfer complete indication signal such that the early receive indication signal occurs during the period of time the host processor is servicing the network adapter.

Other aspects and advantages of the present invention can be seen by one skilled in the art upon review of the figures, the detailed description of the claims which follow.

BRIEF DESCRIPTION OF THE FIGURES

FIG. 4 is a block diagram of the network interface adapter according to the present invention.

FIG. 5 is a functional block diagram of the interface controller chip shown in FIG. 4.

FIG. 8 is a memory map of the adapter memory independent of the host system address space.

FIGS. 9a–b illustrates the transmit and transfer descriptor data structures according to one aspect of the present invention.

FIGS. 13a–b are typical data frame formats with representative threshold values.

FIG. 14 is a logic flow diagram for the selection of the data length for the length-left threshold logic.

FIG. 21 is an upload indication control state machine diagram of the upload indication function in the upload DMA block of FIG. 5.

FIGS. 22a–d show the timing sequence of a transfer complete signal under various conditions.

FIG. 23 is a transfer complete threshold register schematic of the upload indication function in the upload DMA block of FIG. 5.

FIG. 24 is a transfer delay met register schematic of the upload indication function in the upload DMA block of FIG. 5.

DESCRIPTION OF THE PREFERRED EMBODIMENTS

Figure 1:
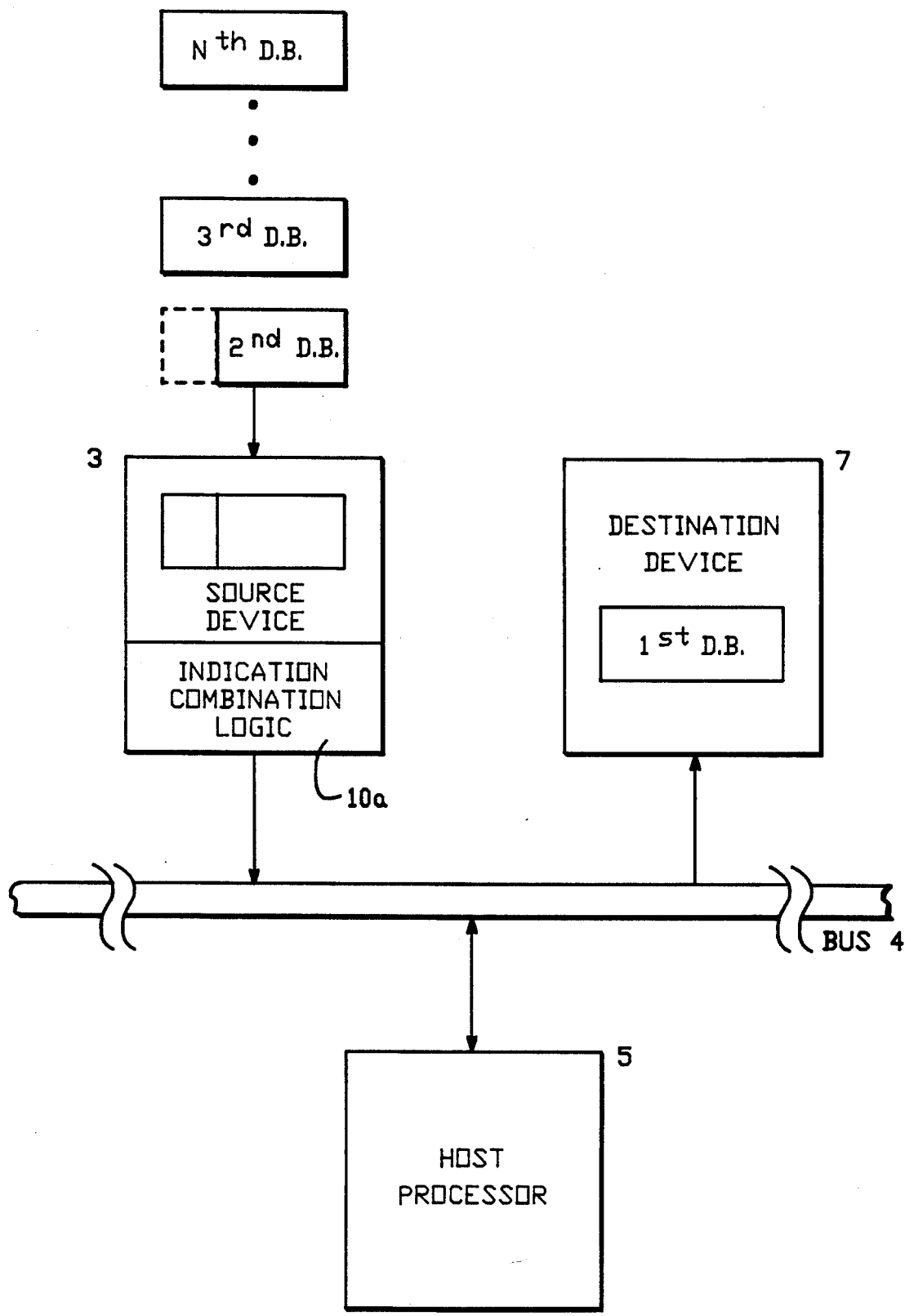
FIG. 1 illustrates a source device with indication combination logic in a host system.

A detailed description of the preferred embodiments of the present invention is provided with respect to the figures. FIG. 1 illustrates a host system with a source device including indication combination logic. FIGS. 2 through 5 describe a network adapter implementation according to the present invention. FIGS. 6 through 12 illustrate the data organization and data flow in a preferred embodiment of the present invention. FIGS. 13 through 19 describe the receive threshold logic. FIGS. 20 through 26 describe the indication combination logic.

FIG. 1 shows a source device 3 with indication combination logic 10a. Source device 3 is coupled to bus 4 with host processor 5 and destination device 7. FIG. 1 illustrates the state of operation in which a first data block (D.B.) has been transferred to destination device 7 while a portion of a second D.B. is ready for transferring in source device 3. In this embodiment, second D.B. through $N^{th}$ D.B. is shown to be outside of source device 3. However, in other embodiments, the data blocks may be present in source device 3 and may need to be prepared before transfer to destination device 7. In the present state of FIG. 1, an indication signal that the first D.B. has completed transfer would be combined with an indication that a portion of the second D.B. is ready for transfer causing a single interrupt to host processor 5.

Figure 2:
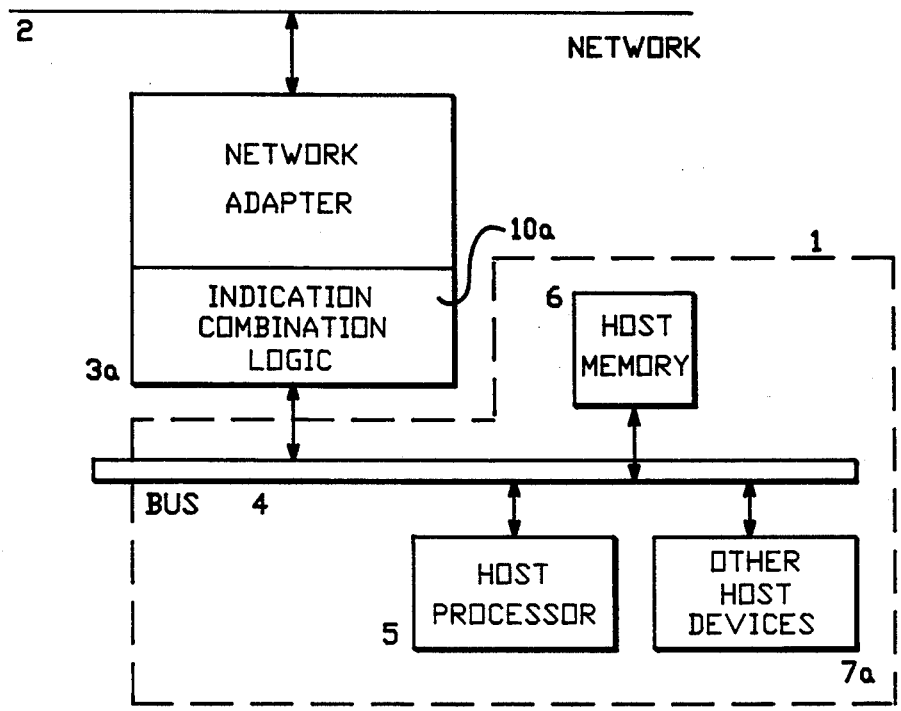
FIG. 2 is a network adapter configuration according to the present invention.

FIG. 2 is a network adapter configuration according to the present invention. Network adapter 3a with indication combination logic 10a is coupled to network 2 and a host system 1. Network adapter 3a is responsible for transferring data frames between network 2 and host system 1. In the preferred embodiment, network 2 is an ETHERNET network. The host system includes a host bus 4, such as an EISA bus. The host system bus 4 includes address lines which define a host system address space. Typically, for an EISA bus, there are 32 address lines establishing a host system address space of about 4 gigabytes. The host system further includes host memory 6, host processor 5, and other host devices 7a coupled to host bus 4. Typically, devices on host bus 4, such as network adapter 3a, request service from host processor 5 by generating an interrupt on host bus 4. The host processor 5 then must save its system parameters and determine which device caused the interrupt and what service is required. The host system performance is degraded whenever host processor 5 must service an interrupt generated by network adapter 3a or any other device on bus 4.

Indication combination logic 10a in network adapter 3a is designed for reducing the number of interrupts generated to host processor 5. Indication combination logic 10a makes a determination of when to generate a transfer complete indication signal such that it is generated slightly before the occurrence of a ready indication signal of the next data frame to be received. Therefore, host processor 5 is able to service the early receive indication of the next frame during the interrupt service routine caused by the transfer complete indication of the first frame. By allowing the host processor to service two indications during a single interrupt service routine, the number of interrupts may be reduced by a factor of two which greatly enhancing host system performance during data frame transfers.

Figure 3:
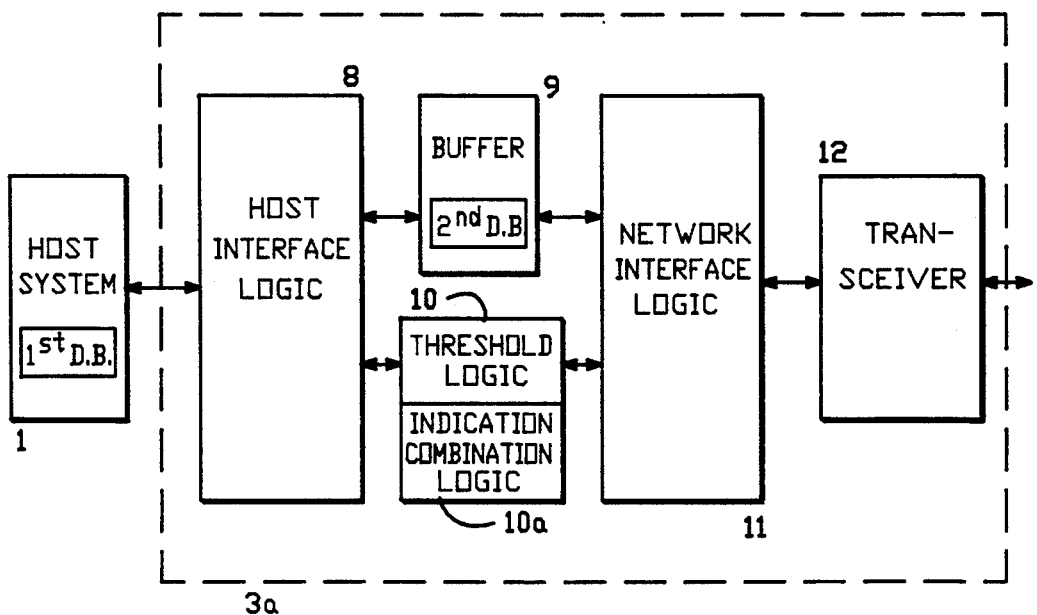
FIG. 3 is a functional block diagram of the network adapter with indication combination logic and threshold logic for host indication optimization according to the present invention.

FIG. 3 is a functional block diagram of network adapter 3a with threshold logic 10 and indication combination logic 10a illustrating the various transfer paths. Network adapter 3a contains transceiver 12 which transmits and receives data frames across network 2. Network interface logic 11 is responsible for the transfer of a data frame between network buffer 9 and transceiver 12. Likewise, the network adapter 3a contains host interface logic 8 which is responsible for transferring a data frame between network buffer 9 and host system 1. Threshold logic 10 contains an alterable storage location (not shown) which contains a threshold value. This threshold value represents the amount of a data frame which will be transferred into or out of buffer 9 before an early indication signal will be generated which may cause host interface logic 8 to send an interrupt to host processor 5. Host processor 5 has access to the alterable storage location containing the threshold value through host interface logic 8.

The threshold logic also includes a means for the host processor 5 to dynamically alter the time at which an indication is generated based on prior host processor 5 responses. When responding to an interrupt, the host processor may examine network adapter status information to determine if host processor 5 is servicing the interrupt too early or too late. The host processor 5 then may alter the threshold value in the alterable storage location in order to obtain the optimal generation of an indication signal.

I. System Overview

FIG. 4 is a schematic diagram of host system 1 with the network interface adapter of the present invention. The network interface controller includes a network interface processor 14, implemented in one preferred system as an application specific integrated circuit designed to implement the functions outlined below using VERILOG design tools as known in the art. The VERILOG design tools are available from Cadence, Inc., San Jose, Calif. The network interface processor 14 is coupled through appropriate buffers to the bus 13. The network interface processor 14 is also coupled to random access memory 15, BIOS ROM 16, and INFO EEPROM 17, a test port 18, an encode/decode chip 19, and a network transceiver 20. The network transceiver 20 is, in turn, coupled to a network medium.

A majority of the functionality is embodied in the network interface processor 14. In the preferred embodiment, all registers that are accessible across the bus 13 by the host system reside either in the processor 14, or in the RAM 15. If resident in the RAM 15, their access is managed by the network interface processor 14.

The RAM 15 is a primary resource on the network interface controller. This resource provides buffer memory outside the host address space used in the transmit and receive operations of the network interface. Details concerning the organization and utilization of this RAM 15 are described below.

The BIOS ROM 16 provides extension to the host system's basic input/output code through the network interface processor 14 during initialization. The addresses for the BIOS ROM 16 and the data from the BIOS ROM 16 are coupled to the network interface processor 14 across buses 21 and 22, respectively, which are also shared by the RAM 15.

The INFO EEPROM 17 stores critical adapter specific data used by drivers, diagnostics, and network management software. This data is stored during the manufacturing process. During initialization of the interface controller, the contents of the EEPROM 17 are loaded into a prespecified area of the RAM 15 for use during operation.

Coupled to the interface processor 16 is an encode/decode chip 19, such as the National Semiconductor 8391 Manchester encode/decode chip. The signals coupled to the AUI connector are provided to allow use of transceivers external to the board.

The transceiver 20 is a preferred system comprises either a thin Ethernet (coax/BNC) transceiver or a 10BaseT (Type 3/RJ-45) transceiver. Control signals for the transceiver 20 are produced on the network interface controller 14, using the conversion logic on the encoder/decoder chip 14.

A test port 18 is provided in a preferred system for use during manufacture and testing.

II. Controller Functional Units

FIG. 5 provides a block diagram of the network interface processor 14 of FIG. 4, including functional blocks and data paths. There are numerous connections not shown having to do with the control of the various data flow paths. The interfaces illustrated include a RAM interface 50, a host bus interface 51, and a transceiver interface 52. The bus interface 51 is implemented for an EISA bus, and operates at times either as a master or as a slave on the bus. Each of the functional units in the implementation shown in FIG. 5 is described below.

A. EISA Slave Interface 54

The EISA slave interface 54 provides a path for the EISA host bus to access the registers and buffers managed by the network interface controller. The module contains configuration registers for the controller, and performs crude decoding of the EISA bus for the purpose of routing signals. The EISA slave interface 54 does not interpret any of the addressing of individual registers distributed throughout the controller.

In operation, the EISA slave interface continuously monitors the EISA address bus and determines when the configuration registers, memory mapped network registers, or BIOS ROM of the adapter are being accessed.

In addition, for every memory slave cycle initiated by the EISA bus, the EISA slave interface will post a cycle request to the cycle arbiter 56. The cycle arbiter imposes wait states upon the host system until the request has been granted.

The EISA slave interface also provides a generic 32 bit bus interface to the remainder of the network controller. The generic nature of the interface allows for easy adaptation of the design to other bus types, such as the microchannel, without requiring redesign of the remainder of the chip.

Bits 14-2 of the EISA address bus are latched and pass through to other modules. The least significant two bits of the address are represented by 4 byte enables that are also valid throughout a data transfer cycle. Four 8-bit byte lanes make up the slave data channel. The data bus is actually a pair of unidirectional buses, one for writes and one for reads in a preferred system. The data write bus is wired in a multi-drop fashion to all modules that require connection to the EISA data bus through the slave interface. The read bus is multiplexed and masked in the RAM interface module 50. Write requests by the EISA bus can be held until they are acknowledged by the cycle arbiter 56. When a cycle is held, the EISA bus may be released from wait states while the cycle completes on the adapter. If a second cycle is generated by the EISA bus while the first one is still pending, then the EISA bus will be held off with wait states until the pending write is performed. In this specific embodiment, pipelining of EISA reads is not supported.

The EISA slave interface also provides an interface to the EEPROM 17. This interface operates to transfer the contents of the EEPROM 17 into the adapter memory after reset.

There are numerous registers in the EISA slave interface module 54, primarily related to configuration of the adapter that conform to the EISA bus specification. These registers do such things as set up the adapter's memory base address, the interrupt level, the transceiver type selection, and the BIOS ROM enable. The configuration registers also provide the host with a positive means of identifying the adapter type and to globally disable the adapter.

B. EISA Master Interface 55

The EISA master interface 55 handles requests from the upload DMA 57 and download DMA 58 for performing bus master operations across the EISA bus. The EISA master interface 55 autonomously arbitrates between pending upload and download requests, because of the EISA bus disallowing mixed reads and writes while performing burst transfers, used by the DMA operations of the preferred embodiment.

The bus master transfers are always initiated by either the upload DMA 57 or the download DMA 58. The transfers may be terminated by either the DMA modules upon completion of a transfer, or by the EISA master interface upon preemption by another arbitrary device on the EISA bus.

Thus, the function of the EISA master interface 55 is to arbitrate for access to the EISA bus when transfer requests are pending from either or both of the upload DMA 57 and the download DMA 58. The EISA master interface 55 performs the signalling necessary to establish first transfers with address slaves on the bus. It also ensures compliance with the EISA bus definitions.

This module also converts real mode segment:offset addresses to 20 bit linear addresses when enabled by the adapter mode logic 59.

C. Master/Slave Union Module 53

The master/slave union module 53 provides for sharing of connections to the EISA bus by the EISA master interface 55 and the EISA slave interface 54. This union module 53 consists primarily of a series of 2:1 multiplexers.

D. Interrupt Controller Module 60

The controller also includes an interrupt controller module 60. The interrupt controller module 60 implements various interrupt and indication functions, including masking and enable/disable mechanisms. Interrupt signals are generated by various modules within the controller, and are routed to the interrupt controller module 60. The interrupt controller module 60 then passes the interrupt signals through various enables and masks before OR-ing them together and driving the result onto the host bus.

The interrupt controller module 60 does not detect interrupt worthy events or acknowledge the interrupts passed to the host. It includes a number of ASIC-resident registers utilized in the interrupt handling functions.

E. Adaptor Mode Module 59

The adapter mode module 59 provides a number of functions including setting various basic operating modes of the controller, and reporting status of various conditions of the controller. The adapter module 59 also establishes the base address of a window register used for diagnostics by the host system. Furthermore, the adapter mode module 59 generates reset functions for the adapter. Also, this module provides the MAC ID register which identifies the media access controller implemented by the device, for communication to various modules within the controller and to the host system.

F. Cycle Arbiter Module 56

The cycle arbiter module 56 is responsible for distributing access to the adapter's RAM resident and ASIC-resident registers through the RAM interface 50 among various requestors. It functions to allow timely access to the RAM by modules that are most in danger of suffering an overrun or underrun conditions in response to a priority scheme.

G. Multicast Comparator Module 61

The controller illustrated in FIG. 5 also includes a multicast comparator module 61. When enabled by the adapter mode module 59, the multicast comparator module 61 performs a bit by bit comparison of a received frame's destination address field with contents of the multicast address table. The multicast address table is established in the host and stored in RAM 15. A mismatch during this compare, coupled with neither an individual address nor a broadcast address match, will result in the rejection of an incoming frame.

Thus, the multicast comparator module 61 monitors the activity of the Ethernet receiver module 62 and the receive DMA module 63 to determine when a new frame is being received. Each byte that is received by the Ethernet receiver 62 and presented at the parallel interface 64 of the receiver, is shadowed by the multicast comparator module 61. These bytes are then compared against valid entries in a multicast address table accessible by the multicast comparator 61.

The multicast comparator 61 does not establish or maintain the contents of the multicast address table. However, the module detects the host accesses to the table and supplies appropriate redirection offsets to the RAM interface module 50.

H. Statistics Controller Module 65

The preferred system also includes a statistics controller module 65. This module monitors activity of various other modules within the controller, most particularly the Ethernet transmitter module 66 and the Ethernet receiver module 62, and updates statistics maintained in RAM 15 as applicable events occur.

I. Download DMA Module 58

The download DMA module 58 is responsible for issuing requests for bus master downloads of data from the host system to the adapter memory. This data is then deposited within the adapter's onboard transmit data buffer for either immediate or future transmission.

As soon as buffer descriptors are defined and one of the transmit data buffers becomes available, as described below, the download DMA module submits requests for download bus master operations to the EISA master interface 55. The download DMA module 58 performs byte alignment, including any required packing and unpacking to align the data as implied by the respective starting addresses of the host and the adapter.

The download DMA module 58 also includes logic for maintaining the transmit descriptor ring buffer within the adapter's RAM. The download DMA module 58 generates an interrupt in the appropriate mode to indicate completion of the download operation. Also, the download DMA module 58 informs the transmit DMA module 67 when it is time to begin transmission. Various registers involved in the download DMA operation are described in more detail below as they are involved directly in the data buffering process of the present invention.

J. Transmit DMA Module 67

The transmit DMA module 67 operates to fetch bytes from the transmit descriptor buffer, the transmit data buffer, or both, as described below, when directed to do so by the download DMA logic 58. The fetched bytes are then presented in sequence to the Ethernet transmitter module 66.

Thus, the transmit DMA module 67 functions to read the contents of the transmit descriptor ring buffer to determine the extent of immediate data, and the length of the overall frame to be transmitted. If a frame specified does not match the specifications for the network, for instance, is shorter than the 802.3 minimum, and the adapter is so enabled, this module will supply additional bytes of undefined data to the Ethernet transmitter module 66 as padding.

Collision retries in the CSMA/CD network are handled by the transmit DMA module 67. When a collision is indicated by the Ethernet transmitter 66, the transmit DMA module 67 will resubmit the same frame by reinterpreting the frame descriptor in the buffer.

If enabled, and when the transmit complete condition is satisfied, a transmit complete interrupt is generated for handling by the interrupt controller 60 in the transmit DMA module 67.

The transmit DMA module 67 also stores appropriate frame status in the transmit descriptor ring buffer of the adapter upon completion of transmission.

The transmit DMA module 67 also detects underrun conditions, when a shortfall of data available for transmission occurs.

Again, registers involved in operation of the transmit DMA module 67 are described in detail below.

K. Ethernet Transmitter Module 66

The Ethernet transmitter module 66 is an essential implementation for an 802.3 standard network. This module accepts parallel data bytes from the transmit DMA module 67 and applies the 802.3 access rules, and supplies serial data to the external encoder/decoder chip.

L. Ethernet Receiver Module 62

Similarly, the Ethernet receiver module 62 is an essential 802.3 implementation. This module accepts serial data from an external encoder/decoder, applies the 802.3 rules to the data and presents the data in parallel form for use by the receive DMA module 63. Thus, the Ethernet transmitter 66 and Ethernet receivers perform the standard CSMA/CD functions.

M. Receive DMA Module 63

The receive DMA module 63 is a complement function to the transmit DMA module 67. This module is responsible for accepting parallel data bytes on the Ethernet receiver 62 and depositing them in the adapter's receive ring buffer.

The receive DMA module 63 is responsible for assembling bytes from the Ethernet receiver into 32 bit words prior to storage in the adapter's RAM. At completion of frame reception, the frame's status and length are deposited within the receive ring buffer for use by the host system.

The receive DMA module 63 is also responsible for establishing and maintaining of the receive buffer ring within the RAM of the adapter as described in detail below. Furthermore, the positioning of the "LOOK-BUF" register allowing the host to view received data, as described below, is handled by the receive DMA module 63.

The receive DMA module 63 also handles interrupt indications under appropriate conditions.

N. Upload DMA Module 57

The upload DMA module 57 performs data transfers from the receive buffer through the RAM interface 50 to the host system. Thus, the receive ring buffer is managed by the receive DMA module 63 and interpreted by the upload DMA 57. Actual bus master transfers are carried out by the EISA master interface module 55.

The upload DMA module 67 interprets data structures deposited in the receive ring buffer by the receive DMA module 63 including the location and length of a received frame. It also reads the transfer descriptor which is defined by the host system to determine how many bytes of the frame to transfer, and where in the host memory to transfer the frame.

The upload DMA module 57 requests bus master cycles from the EISA master interface module 55 in response to valid transfer requests deposited by the host.

The upload DMA module 57 also utilizes an interlock between the receive DMA module 63 and the upload DMA module 57, to reduce the transfer rate to the host system to prevent "getting ahead" of the frame being received through the receive DMA module 63. Finally, this module generates interrupts indicating completion of a transfer for use by the host. Various registers involved in this procedure are described below.

O. RAM interface Module 50

The RAM interface module 50 provides multiplexers and masks for various functions involved in addressing the RAM. The module multiplexes the various address and data sources together to form parameters for RAM access cycles. This module 50 is responsible for gathering up data from the various other modules on the controller that can be read by the host system. Additionally, this module applies a mask to the data to force unused upper bits to a zero, and latches data words for multicycle reads.

P. JTAG Module

Also included in the controller, though not shown, is a JTAG module which implements a state machine as specified in IEEE standard 1149.1-1990, May 21, 1990. This module provides a scan test of the ASIC's pins for use during manufacture.

III. Transmit and Receive Data Flow and Structure

Figure 6:
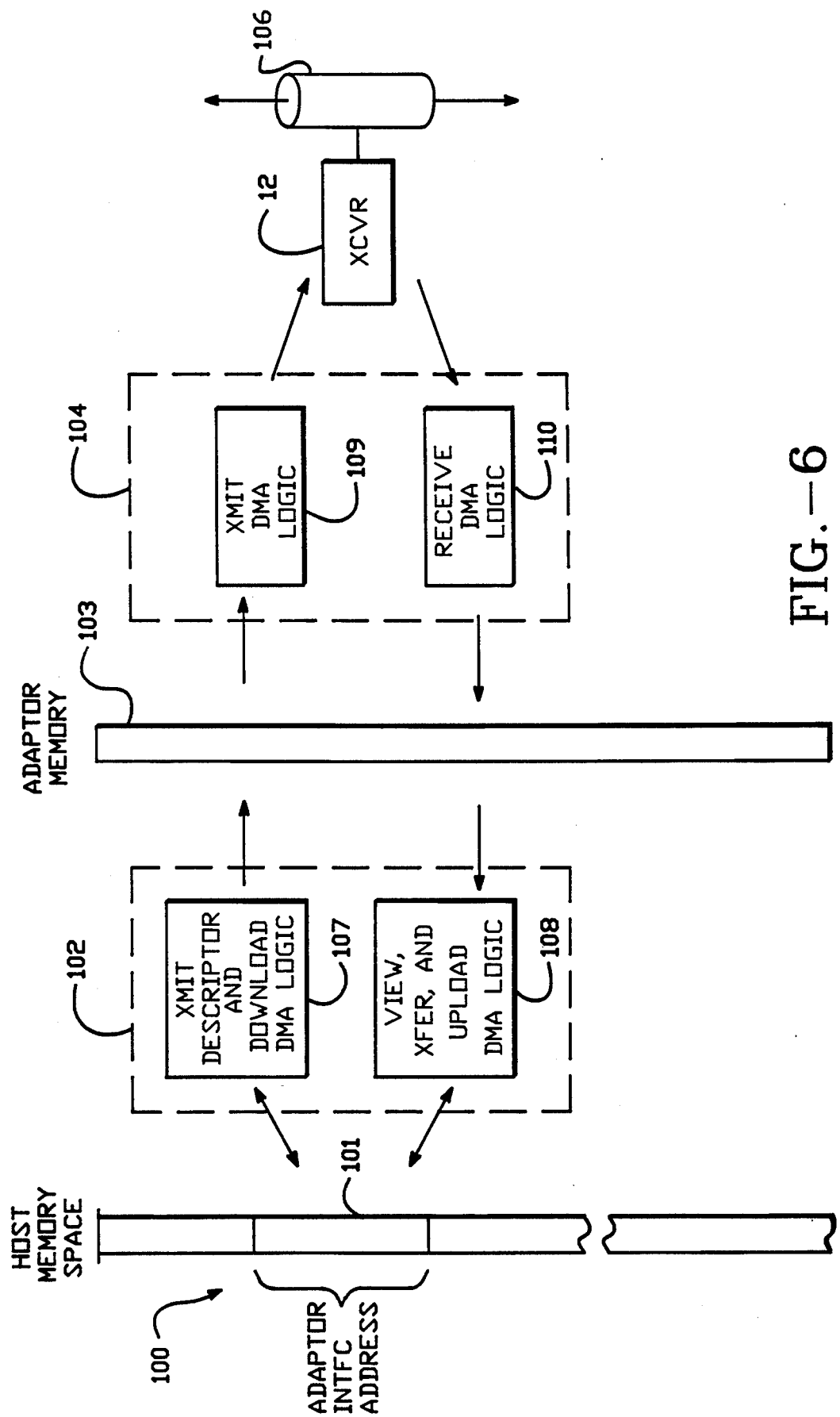
FIG. 6 is a schematic diagram illustrating data flow from the host memory space through adapter memory to the network according to the present invention.

FIG. 6 provides a heuristic data flow diagram of an adapter according to the present invention emphasizing the host interface, the adapter memory and the network interface data flow for transmission and reception.

As mentioned above, the host system will include a host memory space (generally 100) defined by the addresses on the host bus. A prespecified block 101 of the host memory space is set aside for the adapter interface addresses. The adapter includes host interface logic 102 which is responsive to accesses across the host bus within the adapter interface address block 101. Also in the adapter is a host independent memory 103. The host interface logic operates the transfer data between the specified block 101 of addresses and the independent memory. The adapter also includes network interface logic 104 which is coupled to the adapter memory. The network interface logic manages transfers of data from buffers in the independent memory 103 and the network transceiver 12. The network transceiver 12 then supplies the data onto the network medium 106.

The host interface logic includes a transmit descriptor logic and a download DMA logic (generally 107) used in the transmit process, and view logic, transfer descriptor logic, and upload DMA logic (generally 108) used in the receive process. These modules basically manage communication of data between the independent memory 103 and the host in response to writes by the host system to the adapter interface address block 101. This relieves the host of any address translations or buffer management functions for the transmit and receive operations.

The network interface logic 104 includes transmit DMA logic, (generally 109) and receive DMA logic (generally 110). The transmit DMA logic 109 is responsive to descriptors stored in the adaptor memory 103, as described below, for moving data out of the independent adapter memory 103 to the network transceiver 12. Similarly, the receive DMA logic 110 is responsible for moving data from the transceiver 12 into the independent adapter memory 103. Thus, all communications of data from the network medium 106 are coupled directly into host independent memory 103. Communications from the host independent memory 103 are then controlled through the host interface logic 102 in response to a memory mapped region in the host memory space, greatly simplifying the protocol software necessary to communicate with the network.

Figure 7:
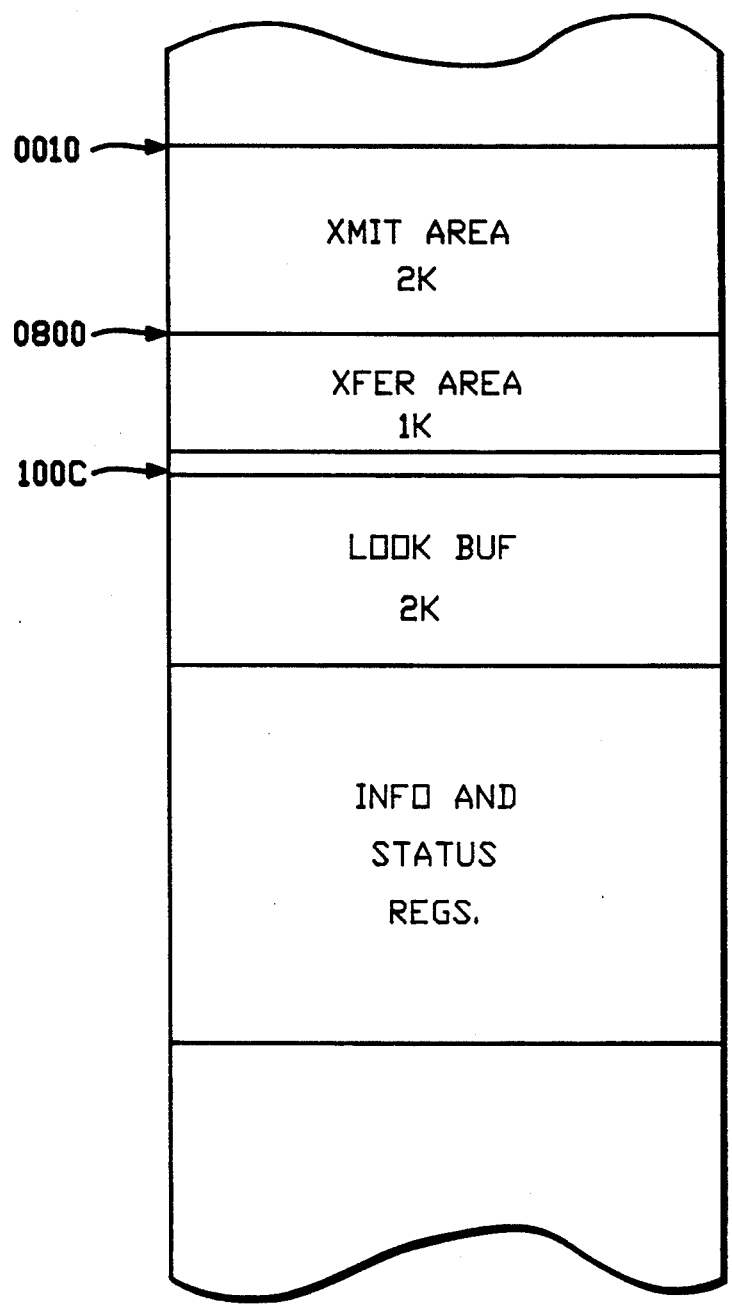
FIG. 7 is a map of the host system address space used for any transmission of data according to the present invention.

FIG. 7 provides a simplified map of the adapter interface host address block 101. The addresses within this block appear to the host like memory mapped registers in a continuous 8K block of the host address space in a preferred system.

For the EISA embodiment, "registers", or mapped areas, in the block 101 are located on double word address boundaries, thus, addresses are a multiple of four. Many of the "registers" occupy several double words (as many as 509) of memory space.

Although the "registers" are memory mapped to an arbitrary prespecified block of host address space, none of the reads or writes performed by the host system to these registers actually directly access the adapter memory. Rather, the accesses to the memory mapped space are interpreted by the host interface logic 104 transparent to the host system. Thus, the memory in the adapter is independent of the host address space and of host management. FIG. 6 provides an overview mapping of the adapter interface host address space used for accessing these registers. The registers include primarily a transmit area register (XMIT AREA) at offset 0010(hex), a transfer area register (XFER AREA) at offset 0800(hex), and a look buffer (LOOKBUF) at offset 100C(hex). Various status, statistics, information, and indication registers are distributed throughout the balance of the area.

The XMIT AREA register is used by the host to write transmit descriptors into the adapter. The transmit descriptors are described in more detail below, but include data that identifies data to be compiled and transmitted as a frame, and may include immediate data. The XMIT AREA at offset 0010(hex) is approximately 2K bytes in size. This data is mapped into a transmit descriptor ring in the independent adapter memory as described below.

The XFER AREA at offset 0800(hex) in the adapter interface host address block is a buffer of approximately 1K byte through which transfer descriptors are written into the independent memory of the adapter. The LOOKBUF area at offset 100C(hex) is a buffer of approximately 2K bytes providing a read only window into a receive ring buffer within the host independent adapter memory.

FIG. 8 provides a map of the host independent memory on the adapter. This memory is organized into a transmit data buffer at offset 0 of approximately 3K bytes, a transmit descriptor ring at offset 0C00(hex) of approximately 5K bytes, a receive buffer ring at offset 2000(hex) of approximately 22K bytes, and a transfer descriptor area at offset 7800(hex) of approximately 1K bytes is provided in the independent memory. The last three areas of memory include adapter information, network statistics, and multicast address tables for use by the adapter.

In the preferred system, the adapter uses 32K bytes of static RAM for the transmit buffers, receive buffers, control structures, and various status and statistics registers. Several of the regions in the adapter's memory defined in FIG. 8 provide defined data structures.

A. Transmit Data Buffer

The transmit data buffer occupies 3K bytes as mentioned above. This region is divided into two 1.5K buffers. Only the data that are downloaded to the adapter via bus master transfers are stored in these buffers. The controller will use both the contents of the transmit data buffer and the immediate data portion of the transmit descriptors, when encapsulating a frame for transmission. The adapter automatically alternates the use of the buffers after choosing the buffer closest to the base of the memory as the power up default.

The transmit buffers are shared by the download DMA logic and the transmit DMA logic. The transmit DMA logic may switch from buffer 0 to buffer 1 and back again freely. The only restriction being the availability of transmit data as defined by the transmit start threshold register. The transmit DMA module switches from one buffer to the other whenever it has completed a transmission. The buffer switch occurs regardless of whether or not the transmission was successful and regardless of whether or not bus master download data were used in the preceding transmission.

The download DMA module may only switch from one buffer to the other, if the buffer it is going to switch to is not being used by the transmit DMA module. Download DMA will attempt to switch from one buffer to another every time it completes processing of a transmit descriptor as described below, regardless of whether or not any bus master operations were called for in the preceding descriptor. However, it will not change to a buffer that is in use by the transmit DMA module.

B. Transmit Descriptors

Transmit descriptors define frames that are pending transmission, and hold the status of frames that have been transmitted. These descriptors are of variable length and are arranged in a sequential fashion around a 5K byte ring buffer as mentioned above. The first entry of the descriptor must align on a double word boundary. FIG. 9a illustrates the transmit descriptor data structure.

The bulk of the contents of an entry into the transmit descriptors region is copied verbatim from the data supplied by the host processor via the XMIT AREA illustrated in FIG. 7. However, in order to comply with the format requirements of the XMIT PROT ID and XMIT FRAME STATUS registers and to supply sufficient information for frame transmission and buffer management; one value must be relocated and several must be deposited automatically.

The host processor's writes to the XMIT AREA are offset automatically by the adapter such that the first value written—XMIT PROT ID and XMIT REQ HANDLE—end up in the fifth 32 bit word location (offset 10(hex)) in the next available data structure in the ring. This means that the XMIT REQ HANDLE value is written by the host to the location reserved for the MACID value. Immediately after the XMIT REQ HANDLE value is written to the adapter3 s RAM, the adapter must copy the contents of the least significant 16 bits of the fifth 32 bit word location to the most significant 16 bits of the fourth 32 bit word location. After copying XMIT REQ HANDLE, the adapter will retrieve the MACID value from the MACID register and write that to the location vacated by XMIT REQ HANDLE. Later, after frame transmission, the least significant 16 bits of the fourth 32 bit location (offset C(hex)) will be updated with the transmit frame's status.

The NEXT DESCRIPTOR POINTER entry may be updated by the adapter any time after the XMIT BUFFER COUNT and XMIT IMMED LEN values have been written to the adapter. Because the data written to the XMIT AREA register must be written in a precise order to exact locations, the writes of these two values can be easily detected and used for the descriptor size calculations required to determine the start of the next descriptor without having to retrieve the values from RAM.

Finally, once the last XMIT DATA LEN value has been written to the adapter, the frame length can be calculated and deposited in the FRAME LENGTH position of the data structure. This value is also copied to the XMIT FRAME LENGTH register in the controller chip for immediate use by the host.

The next several paragraphs define each of the fields of the transmit descriptor data structure.

The NEXT DESCRIPTOR POINTER value points to the first word of the next descriptor. This value is updated immediately after the host reads XMIT QUEUE STATUS. NEXT DESCRIPTOR POINTER being defined does not necessarily imply that the location pointed to contains a valid descriptor. It merely indicates where the next valid descriptor may be found once it is defined.

The FRAME LENGTH field is computed and updated by the adapter, The frame length is calculated by summing all of the XMIT DATA LEN values and the XMIT IMMED LEN value. The resulting sum is the total number of bytes in the transmit frame. If the sum is less than the 802.3 minimum frame length, then the sum will be set to the minimum frame length value. The sum is written to the FRAME LENGTH line of the transmit descriptor and is also made available to the host via the XMIT FRAME LENGTH register.

The XMIT FAILURE field contains the error code that is made up of the status bits gathered from the Ethernet transmitter after the completion of transmission. This field is mapped to the XMIT FAILURE register for host access.

The XMIT REQ HANDLE value is interpreted by the transmit DMA controller to determine whether or not to generate an indication upon completion of the transmission attempt(s) for the associated frame. If the field is non-zero, an indication will be generated. Also, the frame's entry in the transmit descriptor ring will be maintained until the host has had an opportunity to examine the transmit status. The XMIT REQ HANDLE, XMIT STATUS, XMIT PROT ID, and the MACID fields are all made available to the host when an indication is generated. If XMIT REQ HANDLE is a zero, then the transmit descriptor queue entry is discarded after transmission without notifying the host in any way. Transmit underrun conditions are posted regardless of a zero XMIT REQ HANDLE.

The XMIT STATUS field contains the transmit status for the associated frame. The contents of this field are updated immediately after the transmission attempt(s). The return codes are defined in the XMIT STATUS register definition.

The XMIT PROT ID value in this field is merely maintained within the queue for use by the host upon completion of the transmission to identify the particular protocol responsible for the frame. It allows simultaneous activity of multiple protocols. Together XMIT PROT ID and XMIT REQ HANDLE uniquely identify a frame passing through the adaptor.

The MACID, like XMIT PROT ID, is maintained within the queue for use upon completion of the transmission. However, the host does not write this value to the adapter via the XMIT AREA register. Rather, the host stores this value once in the MACID register and then depends upon the adapter to deposit this value into the descriptor data structure after XMIT REQ HANDLE has been copied to its final position.

The contents of the XMIT BUFFER COUNT field are supplied by the host via a write to XMIT AREA. This field specifies the number of buffers within the host's memory that are used to make up the transmit frame. Each of the buffers is transferred in the order listed from the host's memory to the adapter's transmit data buffer as soon as one of the two transmit data buffers becomes available. If XMIT BUFFER COUNT is zero, then no bus master operations will be performed for this frame.

The XMIT IMMED LEN field, defined by a write from the host to XMIT AREA, specifies the number of "immediate" data bytes that will be supplied by the host. If this field is zero, then the next 32 bit word location will contain the first host data buffer descriptor and the entire frame will be transferred to the adapter via bus master cycles. The XMIT IMMED LEN value will not necessarily be a multiple of four. The location of the first host data buffer descriptor is determined as follows: DESCRIPTOR OFFSET=((XMIT IMMED LEN+3) & fffc(hex))+18(hex).

The variable length IMMEDIATE DATA field contains the immediate data deposited to the adapter by the host using memory writes to XMIT AREA. This field may vary in length from 0 to 1,514 bytes. Immediate data is inserted into a transmit frame between the preamble and the transmit buffer data (if any) by the adapter during transmission. Generally, immediate data is made up of the destination and source addresses and any protocol-specific header data. It is reasonable, however, for the entire transmit frame to be considered immediate data. This would make it unnecessary for the adapter to perform any bus master operations to fetch the remainder of the transmit frame. If XMIT IMMED LEN is zero, then this field is skipped and the entire frame is assumed to reside in host memory resident data buffers. If XMIT IMMED LEN does not specify an integral number of double words, then the host may round up to the nearest multiple of 4 and write up to that number of bytes. The extra bytes, beyond XMIT IMMED LEN, will be ignored and not included as part of the transmitted frame.

The XMIT DATA LEN field, one of two entries per host data buffer descriptor, defines the number of bytes in the associated host buffer. This value need not be a multiple of four.

The 32 bit XMIT DATA PTR value is the physical starting address of the associated host data buffer. This value need not be a multiple of four.

C. Receive Buffer

The receive buffer is a 22K byte ring of variable length receive frames. Each frame is preceded by a header that defines the frame's size and status and the location of the header of the next frame in the ring buffer.

The beginning of a receive frame entry in the ring can begin on any 32 bit word boundary.

The 32 bit NEXT RCV PTR value contains the address of the NEXT RCV PTR value of the next entry in the ring. This value becomes valid upon completion of the reception of the present associated frame. The buffer pointed to by NEXT RCV PTR may not necessarily contain a valid frame. This must be determined by the ring maintenance pointers that determine the beginning and end of the valid entries within the ring.

The RCV FRAME STATUS word contains the various error codes regarding the condition of the associate frame. RCV FRAME STATUS is updated immediately after frame reception. The contents of this entry are made available to the host via the RCV FRAME STATUS register.

The upper 16 bit word of the RCV FRAME SIZE entry is occupied by the adapter's MACID value. This value is retrieved from the MACID register and deposited in this word of the receive buffer data structure at the same time that the RCV FRAME SIZE value is posted.

The length of the received frame is deposited in the RCV FRAME SIZE register immediately after the frame has been received. The contents of this entry are made available to the host via the RCV FRAME SIZE register.

The RECEIVE DATA field varies in length from 1 to 1,514 bytes. The receive frame—starting with the destination address—is stored in this field as the frame is being received.

D. Transfer Descriptor

The adapter in one preferred implementation accommodates one and only one transfer descriptor at a time. Attempts to download a second descriptor while the first one is being processed will result in a return code from the XFER QUEUE STATUS register that indicates a lack of resources to accept the request. Only the frame currently visible via the LOOKBUF is acted upon by the transfer specification within the XFER AREA register.

The transfer descriptor is stored in adapter RAM using the format of FIG. 9b.

The TD OFFSET word defines the offset into the received frame from which the transfer will commence. This value need not be a multiple of four. Data that the host has already examined (via the LOOKBUF) may not need to be transferred to the host. Therefore, a non-zero value written into the TD OFFSET field will cause the bus master circuit to offset its start address by TD OFFSET bytes before beginning the transfer. This value may range from zero (transfer from the beginning of the frame) to 1,514.

The number of length/pointer pairs is defined in the TD BUFFER COUNT field. As many a 127 entries are allowed. Beyond that, XFER AREA buffer exhaustion is assured. This value must be non-zero.

The TD DATA LEN field contains the size of the host's receive buffer into which receive data will be transferred. The adapter is not restricted to transferring only 32 bit words. Attempting to transfer more than the maximum frame length of 1,514 bytes will cause the adapter to terminate the transfer upon reading the end of the frame.

The 32 bit TD DATA PTR value is the physical address of the first byte of the host's receive buffer. This value need not be a multiple of four.

The physical address of the data buffer in the host to which a received frame will be uploaded is written to the adapter as a 32 bit TD DATA PTR value in XFER AREA. The adapter will use this value as a pointer to the first byte in the receive buffer. There are no restrictions placed on the value of this pointer by the adapter. Byte, word and double word alignment of the buffer data are all supported.

E. Adaptor Info, Network Statistics, Multicast Address Tables

The adapter info, network statistics, and multicast address tables in the adapter RAM memory are utilized for various functions by the adapter, as will be understood by those skilled in the art, not directly relevant to the transmit and receive operation subject of the present application.

IV. Transmission Process

Figure 10:
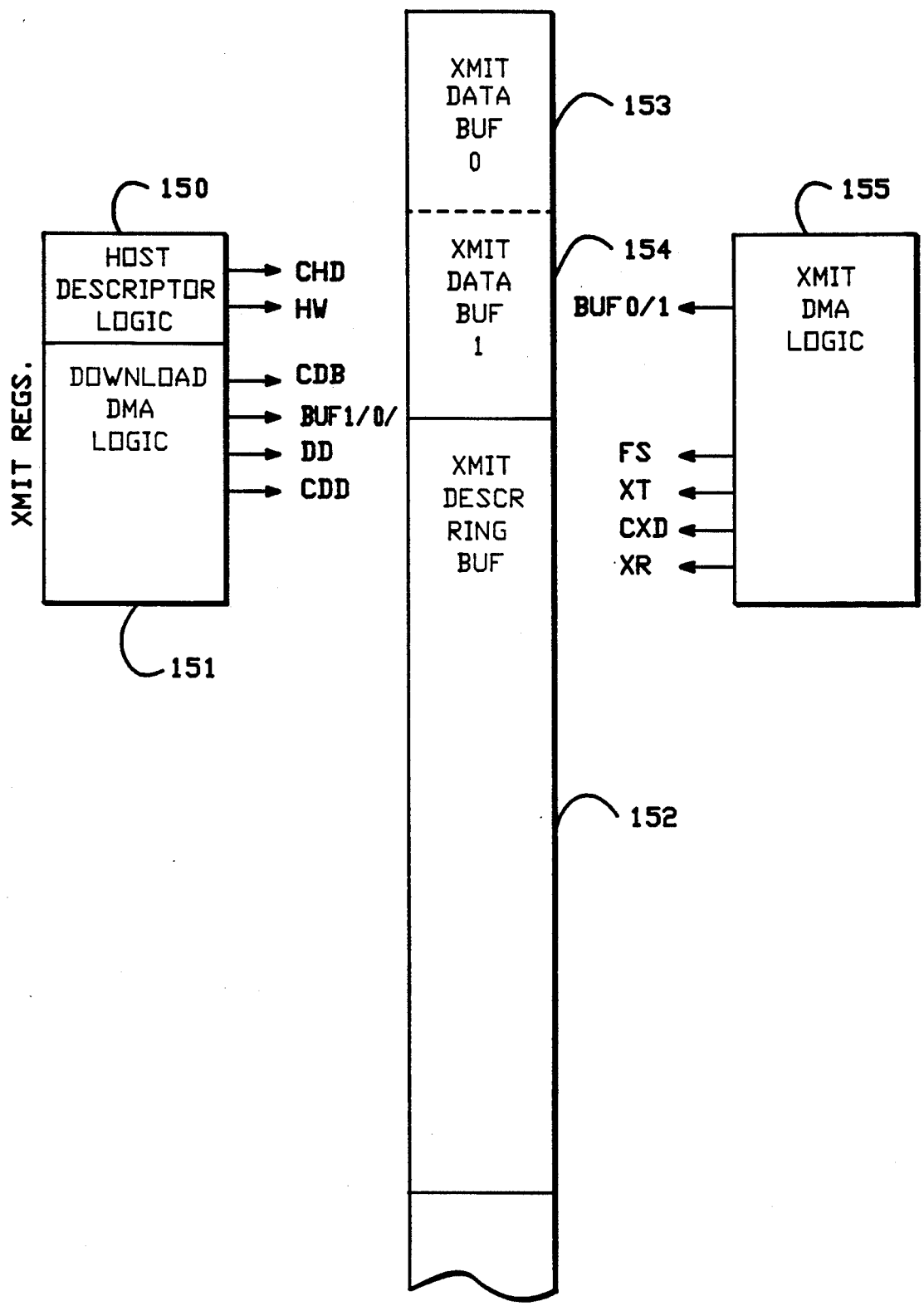
FIG. 10 illustrates the management of the transmit descriptor ring buffer and transmit data buffer, and pointers used during the transmit operation according to the present invention.
Figure 11:
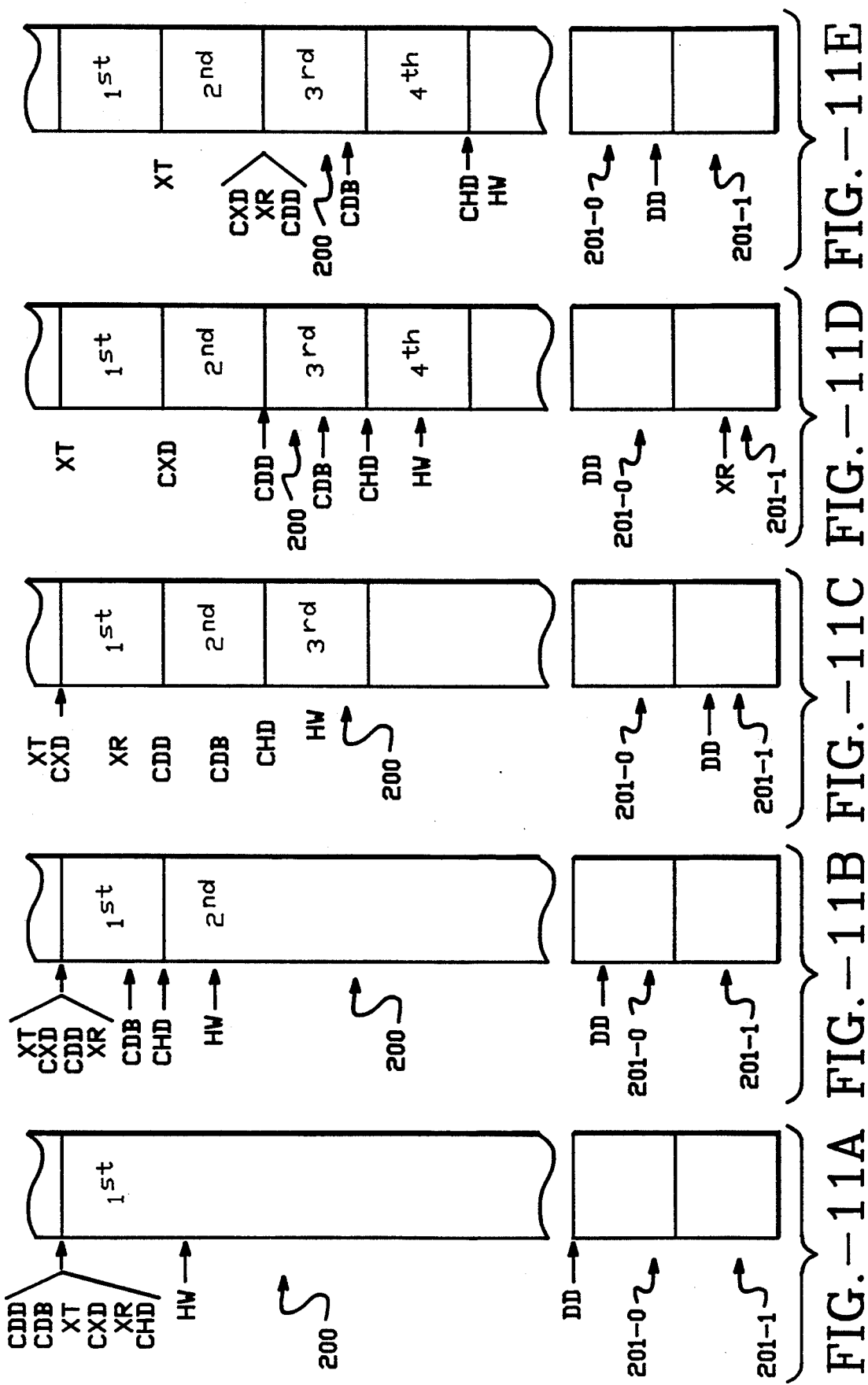
FIGS. 11a–11e are a schematic illustration of the management of the pointers for the transmit descriptor ring buffer and transmit data buffer.

FIG. 10 illustrates the network interface logic and host interface logic used in managing the transmit data buffer and transmit descriptor ring buffer in the independent memory on the adapter. On the host interface side, the logic includes host descriptor logic 150 and download DMA logic 151. The host descriptor logic 150 and download DMA 151 are coupled to the host address space through the transmit "registers" including the XMIT AREA register, the XMIT COMPLETE THRESH register, the XMIT FAILURE register, the XMIT FRAME LENGTH register, the XMIT FRAME STATUS register, the XMIT PROT ID register, the XMIT QUEUE STATUS register, and the XMIT START THRESH register. Details of these registers are described below.

The descriptors illustrated in FIG. 9a are stored in the transmit descriptor area of the host independent RAM on the adapter by host writes to the XMIT AREA address block. Three different processes act upon entries in the descriptor queue. The host writes to initially create transmit descriptors, bus master downloads to move buffer data from host memory to the transmit data buffer and transmission of described frames on the network. The first two processes occur within the download DMA logic 151 and the host descriptor logic 150. Transmission is performed by the transmit DMA logic 155. During the course of adapter operations, the number and status of descriptors in the transmit descriptor ring buffer 152 will vary according to the relative speeds of the host write, download, and transmission processes.

Two variables within the download DMA logic 151 helped describe the status of the transmit descriptor queue. ZERO DOWNLOADS PENDING indicates that there are no complete frame descriptors yet to be processed by the download DMA logic 151 for download. The ZERO FRAMES RESIDENT variable indicates that there are no descriptors which have been already processed by the download process, but are yet to be transmitted.

Each of the three processes that make up the transmission mechanism maintains its own set of pointers to the descriptor queue.

The host descriptor logic 150 generates pointers for the transmit descriptor ring buffer 152 on the adapter memory, which identify the current position of host accesses for writing descriptors in the transmit descriptor ring buffer 152. These pointers are designated the current host descriptor pointer CHD, and the host write pointer HW. The current host descriptor pointer CHD points to the base address of a descriptor currently being written, or expected to be written by the host. The host write pointer HW points to the location within the current descriptor (pointed to by the CHD pointer) to which the host is expected to write next. That is, the HW pointer predicts the offset within the XMIT AREA address block at which the host will be writing to complete the current descriptor.

The download DMA logic 151 generates 3 pointers, and a buffer select signal, while managing downloads from the host system into the transmit data buffers XMIT DATA BUF0 153 and XMIT DATA BUF1 154. The pointers generated by the download DMA logic 151 include the current download descriptor pointer CDD which points to the base address of a descriptor that is currently being processed by the bus master download DMA logic 151. The second pointer generated by the download DMA logic includes the download data pointer DD which points to the location within the current transmit data buffer (either XMIT DATA BUF0 or XMIT DATA BUF1) to which the download process is writing data. The third pointer generated by the download DMA logic 151 includes the current download buffer CDB pointer. The CDB pointer points to the buffer descriptor within the transmit descriptor pointed to by the CDD pointer, in which the specification of the buffer in host memory subject of a current download process resides.

The download DMA logic also selects the current transmit data buffer 153 and 154 to which the download DMA logic transfers data in the bus master operation as heuristically illustrated by signal BUF1/0.

The transmit DMA logic 155 generates three pointers for the transmission process. These pointers include the current transmit descriptor CXD pointer, which points to the base address of the descriptor in the transmit descriptor ring buffer 152 currently being processed by the transmit logic 155. The transmit read XR pointer indicates the location within the current descriptor or current transmit data buffer (153 or 154) from which the transmission process is reading data to be transmitted.

The XMIT TAIL pointer (XT) points to the back end of the queue. The XT pointer points to an older descriptor in the transmit descriptor ring buffer 152 than the CXD pointer when there are frames that have completed transmission, but have not yet had their status information read by the host system.

The preferred system operates in two modes relative to generating indications to the host of the completion of a transmission. The preceding paragraphs described the data structures associated with host write, bus master download, and transmission processes when a XMIT COMPLETE ON DOWNLOAD variable is false and the indicator is generated when the transmission is complete, or when XMIT COMPLETE THRESH (described below) is met. When XMIT COMPLETE ON DOWNLOAD is true, the download DMA logic 151 is also responsible for keeping track of the frames for which status has not been read. In this mode, the host receives the transmit complete indication for a frame upon download of the frame. So it is possible that the frame can be transmitted before the host is able to respond to the indication. This condition allows the XMIT TAIL pointer to no longer define the oldest useful entry in the descriptor ring buffer. Therefore, a frame status process is necessary. The frame status pointer FS points to the base address of the oldest descriptor for which status has not yet been read by the host, in this mode of operations. Since the FS pointer is related to the transmit process, it is illustrated heuristically in the transmit DMA logic 155 in FIG. 10. In the preferred system, however, it is logically coupled with the download DMA logic 151.

The transmit DMA also selects the current transmit data buffer 153 or 154 from which a current transmit frame is being composed, as indicated heuristically by the signal BUF0/1.

The interface to the adaptor is seen by the host as if it were a set of registers at a prespecified address block.

The significant "registers" involved in transmission are outlined below.

A. XMIT AREA

The purpose of this register is to provide a mechanism for the host to supply the adapter with immediate data and a data structure that defines where in the host's memory system the remainder of the frame (if any) resides. The adapter stores this information in the transmit descriptor ring 152 for use when the frame being described can eventually be transmitted.

The adapter uses the address to which the data is written and the order in which it is written to determine what the data represents. The data must be written to the adapter using the structure and order described above with respect to FIG. 7.

Bus master downloads begin after a descriptor has been written to XMIT AREA and XMIT QUEUE STATUS (described below) has been read by the host.

Once the host has completed the transfer of the transmit descriptor buffer structures to XMIT AREA, the host may read XMIT FRAME LENGTH to determine the number of bytes that the host has specified to be included in the transmit frame. XMIT QUEUE STATUS should then be read to advance the CHD pointer so that another frame may be written to this register. After reading XMIT QUEUE STATUS, the contents of XMIT FRAME LENGTH are undefined, until XMIT AREA is filled again.

The actual frame transmission onto the network will commence when two conditions are met: (1) the XMIT START THRESH (described below) condition has been met, or, if XMIT START THRESH is zero, when the entire frame has been copied to the adapter's RAM, and (2) when there are no previously queued transmit requests. If more than XMIT START THRESH bytes of immediate data are written to XMIT AREA, then network transmission may begin before XMIT QUEUE STATUS is read.

If the adapter runs out of XMIT AREA resources while the host is writing data to XMIT AREA, the host will be returned a value of 6 when it reads XMIT QUEUE STATUS. The writes that ended up "off the end" of the memory will not do harm to any data already queued up on the adapter.

The transit frame's destination and source addresses must be explicitly supplied to the adapter for each transmit frame by the host. This information can be provided as part of the immediate data or, if there is no immediate data, as the first fourteen bytes of the first data buffer specified in the descriptor.

Essentially, the host provides every byte of the frame between the start of frame delimiter and the frame check sequence (CRC) through the XMIT AREA register or download DMA operation.

Although in general data must be written to XMIT AREA in the order specified, one exception exists. XMIT BUFFER COUNT/XMIT IMMED LEN may be rewritten after the initial values for these fields have been written, and before any buffer descriptor entries have been written.

The following restrictions apply:

1. When rewriting XMIT BUFFER COUNT/XMIT IMMED LEN, the new value of XMIT IMMED LEN cannot specify a value smaller than the number of immediate data bytes already written to XMIT AREA. It may specify a greater number. If the number is greater, then the remaining immediate data bytes (and any buffer descriptors) shall be written after the new XMIT BUFFER COUNT/XMIT IMMED LEN value is written.

2. When rewriting XMIT BUFFER COUNT/XMIT IMMED LEN, the complete 32 bit quantity must be rewritten, even if one of the values remains the same. The capability to rewrite XMIT IMMED LEN is included to facilitate direct movement of data from one receiving adaptor to another transmitting adaptor in the host system. The operating sequence is as follows:

1. The receiving adapter gives an early receive indication to the host.

2. The host, upon determining that the receive frame should be transmitted on the second adapter, sets up a transmit descriptor in XMIT AREA for the second adaptor specifying a maximum length, all immediate data frame.

3. The host then sets up a bus master transfer on the receiving adapter that specifies the transmitting adapter as the destination of the transferred data. As data are received on one adapter, they are bus-mastered by the receiving adapter into the other's XMIT AREA.

4. When the frame reception finishes, the host determines the frame length, and writes that value into the transmitting adapter's XMIT IMMED LEN field.

B. XMIT COMPLETE THRESH

XMIT COMPLETE THRESH provides for any early indication of transmission completion. (Read/write, 4 bytes, 1 32 bit word.)

The XMIT COMPLETE THRESH register is used to specify the number of transmit bytes that remain to be either transmitted or downloaded to the adapter (depending upon the adaptor mode) before the adapter will issue a XMIT COMPLETE indication. Only bits 10 through 0 are implemented in this register. Values greater than the maximum frame length will prevent this function from operating properly. The method for disabling this function is to set the register to zero. The value in XMIT FRAME LENGTH (see below) is used to determine where the end of the transmit frame is.

If this threshold value is set too high, then the host will respond to the indication before the adapter can provide a valid transmit status indication. If XMIT FRAME STATUS returns a ff(hex), then XMIT COMPLETE THRESH should be adjusted to delay the indication slightly. This is accomplished by reducing the value in XMIT COMPLETE THRESH register. The function of this register is disabled during the transmission of the first 60 bytes of the frame. This register is cleared to 0 during a reset.

C. XMIT FAILURE

XMIT FAILURE returns the cause of a transmit failure. (Read only, 4 bytes, 1 32 bit word.)

This register returns the cause of the failure of the attempt(s) to transmit a queued frame. A non-zero value indicates that the frame encountered one or more errors during the transmission attempt.

The bits in this register are defined as follows:

| | |
|---|---|
| bit 0 | DMA UNDERRUN |
| bit 1 | LOSS OF CARRIER SENSE |
| bit 2 | MAX COLLISIONS |
| bit 3 | SQE TEST FAILED |

This register will contain valid data regardless of the success or failure of the attempt to transmit a frame. If there was no failure, then this register will contain a value of 0(hex). The contents of this register are valid after the frame has completed transmission (low byte of XMIT FRAME STATUS not equal to ff(hex)) and before XMIT PROT ID is read.

If a data underrun occurs, the adapter will force a CRC error into the frame during transmission to assure that the frame is received as a bad frame and is discarded by the destination device.

D. XMIT FRAME LENGTH

XMIT FRAME LENGTH returns the number of bytes to be transmitted. (Read Only, 4 bytes, 1 32 bit word.)

The XMIT FRAME LENGTH register returns the total number of bytes queued up for transmission by the current transmit frame descriptor identified by CXD pointer. This value is the total of the number of immediate data bytes and of all of the buffer length fields downloaded to the adapter for this frame. The value returned by this register does not reflect the effects of any padding of the frame that may be done by the adapter when the frame is less than 60 bytes in length.

The XMIT FRAME LENGTH register becomes valid immediately after the host writes the last byte to XMIT AREA and remains valid until the first write to XMIT AREA after a read of XMIT QUEUE STATUS.

E. XMIT FRAME STATUS

XMIT FRAME STATUS returns the results of a transmit attempt. (Read only, 4 bytes, 1 32 bit word.)

The least significant 16 bits of this register return the status of the attempt(s) to transmit a queued frame. The most significant 16 bits returns the XMIT REQ HANDLE for the frame. A value of XXXX0000(hex) (XXXX is the XMIT REQ HANDLE for this particular frame) is returned for a successful transmission while XXXX000a(hex) is returned for a failed transmission. XXXX00fe(hex) is returned if the adapter is in the process of retrying a transmission after a collision. If the transmission is still in progress, XMIT FRAME STATUS will return a XXXX00ff(hex).

If the frame was not transmitted successfully the specific cause of the transmit failure is available in XMIT FAILURE. Reading XMIT PROT ID advances XMIT FRAME STATUS to the status of the next transmitted frame, if any. If the "retry" status value is returned when XMIT FRAME STATUS is read, then reading XMIT FRAME STATUS will also clear the XMIT COMPLETE indication.

F. XMIT PROT ID

XMIT PROT ID returns the protocol ID of the transmit frame. (Read only, 4 bytes, 1 32 bit word.)

As soon as the adapter has completed its attempt(s) to transmit a queued frame and has posted its status, XMIT PROT ID can be read by the host as a method of identifying the frame. The value returned here is the same value that was written into the XMIT PROT ID field during the queuing of the frame via XMIT AREA.

Reading this register clears the XMIT COMPLETE indication except when the "retry" status value is read from XMIT FRAME STATUS. If "retry" was read, then reading XMIT FRAME STATUS will have cleared XMIT COMPLETE.

The XMIT PROT ID value resides in the upper 16 bits of the 32 bit register. The least significant 16 bits of this register will return the MACID value written to the MACID register. A double-word read will return both values simultaneously.

As multiple frames can be queued up for transmission, so can multiple transmission results be queued. Reading both words of XMIT PROT ID advances the completion status in XMIT FRAME STATUS, XMIT FAILURE, and XMIT PROT ID to the status of the next frame which has completed transmission, if any.

G. XMIT QUEUE STATUS

XMIT QUEUE STATUS returns the results of queuing a transmit frame. (Read only, 4 bytes, 1 32 bit word.)

A read of the XMIT QUEUE STATUS register returns the status of the host's attempt to queue up a transmit frame via XMIT AREA.

2(hex)—Success: If the transmit request was successfully queued, this value is returned when XMIT QUEUE STATUS is read.

6(hex)—Out of Resources: If the adapter runs out of queue storage RAM, then a status of 6(hex) is returned.

7(hex)—Frame Too Long: If the total number of bytes to be transmitted in a single frame exceeds the maximum frame length, this register will return a 7(hex).

a(hex)—Order Violation: If the data written to XMIT AREA is written out of order, then this error code is returned.

ff(hex)—Adapter Not Ready: If XMIT QUEUE STATUS is read too quickly after the completion of the writes to XMIT AREA, it is possible to read the status value before the queuing process is complete.

Reading this register also advances XMIT AREA so that another transmit may be queued. This register MUST be read after all of the data has been written to XMIT AREA and before the next transmit request is written to XMIT AREA.

If an error code (6(hex), 7(hex), a(hex), or ff(hex)) is returned by XMIT QUEUE STATUS, then the frame was not queued and the host will have to attempt to queue it up another time. Naturally, if the frame was flagged as being too long, it will have to be broken up into multiple frames before another queue attempt can be made.

If the code indicating success (2(hex)) is returned, then the host may immediately proceed to attempt to queue up an additional frame. The number of frames that can be queued depends on the amount of RAM on the adapter allocated for this purpose and the amount of immediate data included in each frame.

If the host attempts to queue a frame that is too large and also exceeds the available TRANSMIT DESCRIPTOR free space, the error that occurs first will take precedence and will be returned to the host.

H. XMIT START THRESH

XMIT START THRESH provides for an early begin of transmission. (Read/write, 4 bytes, 1 32 bit word.)

The XMIT START THRESH register is used to specify the number of transmit bytes that must reside on the adapter before it will start transmission. Only bits 10 through 0 are implemented in this register. Values greater than the maximum frame length will prevent this function from operating properly. The method for disabling this function is to set the register to zero. Bytes are counted starting with the first byte of the destination field of the transmit frame.

The number of bytes considered to be available is the sum of the immediate data written to XMIT AREA by the host and those bytes transferred to the transmit data buffers in the adapter using bus master DMA operations. The transmit request will be posted immediately after XMIT START THRESH transmit frame bytes are made available from the immediate data or when the adapter has bus-mastered XMIT START THRESH—XMIT IMMED LEN bytes onto the adapter.

The number of bytes resident on the adapter must be equal to or greater than the value in XMIT START THRESH for the transmission to commence, unless the total frame size is less than XMIT START THRESH. In that case, the frame will begin transmission when the entire frame has been copied to the adapter. The actual transmission of the frame may be delayed by previous pending transmit frames and by deferrals to network traffic. This register is set to zero during a reset.

I. TRANSMISSION RING MANAGEMENT

FIGS. 11A-11E illustrate the progression of the pointers used in the transmit operation. In FIGS. 11A-11E, a portion of the transmit descriptor ring generally 200 and the transmit data buffers 201-0 and 201-1 are shown. Also, the pointers abbreviated as discussed above are indicated.

In FIG. 11A, the host descriptor logic is writing a first descriptor into the transmit descriptor ring 200. Thus, the CXD pointer points to the base address of the first descriptor, the HW pointer points to the offset from the base address to which the host is expected to write the next double word of the descriptor. The download pointers including CDD, CDB are also pointing to the base address of the first descriptor as no download operations have begun. Likewise, the transmit descriptors CXD and XR point to the same base address. Finally, the tail of the ring XT points to the beginning descriptor. The download data pointer DD points to the top of a first buffer, for instance, buffer zero.

As illustrated in FIG. 11B, the first descriptor has completed writing and has begun the download process, and the host has begun writing a second descriptor. Thus, the host descriptor logic pointer CHD points to the base address of the next descriptor, and the HW pointer points to the expected address of the next byte. The download pointer CDD points to the base address of the first descriptor. The down DMA logic is assumed to be in the process of transferring buffers from host into the transmit data buffer. Thus, the CDB pointer points to a descriptor of a download buffer in the first descriptor, and the DD pointer points to an offset within the transmit data buffer at which data is being downloaded. No transmit operations are yet to begin because the threshold has not been reached. Thus, the transmit pointers and the tail pointer still point to the first descriptor.

In FIG. 11C, the host descriptor logic is working on a third descriptor, the download logic is working on the second descriptor, and the transmit logic is working on the first descriptor. The host descriptor logic pointers CXD and XR are working on the first descriptor. Thus, the CXD pointer points to the base address of the first descriptor, and the XR pointer points to immediate data being read for transmission by the transmit DMA logic.

The transmit read pointer XR will complete reading the immediate data and then move to the transmit data buffer filled by the download DMA logic when processing the first descriptor as illustrated in FIG. 11B.

The transmit tail pointer XT still points to base address of the first descriptor.

The download logic is working on the second descriptor. Thus, the CDD pointer points to the base address of the second descriptor, the CDB pointer points to a buffer descriptor within the second descriptor, the DD pointer points to an offset within the second transmit data buffer to which the download DMA logic is transferring data from the host.

In FIG. 11C, the host is writing a third descriptor into the XMIT AREA register. Thus, the CHD pointer points to the base address of the third descriptor, and the HW pointer points to the offset to which the next byte is expected to be written by the host.

In FIG. 11D, the process has moved on so that the host is writing to a fourth descriptor. Thus, the CHD pointer points to the base address of the fourth descriptor, and the HW pointer points to the expected address of the next write to the XMIT AREA register.

The download logic is working on the third descriptor. Thus, the CDD pointer points to the base address of the third descriptor, the CDB pointer points to a buffer descriptor within the third descriptor, and the download data DD pointer points to a location in the first data buffer at which the download is occurring. This operation assumes that the transmit of the first descriptor has freed up the first data buffer for use by the download logic.

The transmit logic is working on the second descriptor. Thus, the CXD pointer points to the base address of the second descriptor, and the XR pointer points to a location in the transmit data buffer from which data is being read by the transmit logic. Since the status of the first descriptor is yet to be read, the transmit tail XT pointer still points to the base address of the first descriptor.

In FIG. 11E, the process is assumed to have progressed so that the write of the fourth descriptor is completed, but the host has ceased writing new descriptors temporarily. In this case, the CHD pointer and the HW pointer point to the base address of a fifth descriptor waiting for further actions by the host. It is assumed that the download process has yet to complete downloading the third descriptor. Thus, the current CDD pointer points to the base address of the third descriptor, and the CDB pointer points to a buffer descriptor within the third descriptor. The DD pointer points to a location in the transmit data buffer to which the download process is downloading data.

In FIG. 11E, it is also assumed that the transmission of the frame identified by the second descriptor is complete, and the transmit logic is waiting for the download operation on a third descriptor to either complete, or download sufficient data that the transmit logic may begin transmission. Thus, the CXD and the XR pointers point to the base address of the third descriptor.

This process continues with automatic ring wraparound of the descriptors handled by the adapter. Also, the underrun condition is monitored and appropriate error signals indicated by the adapter.

V. Receive Process

Figure 12:
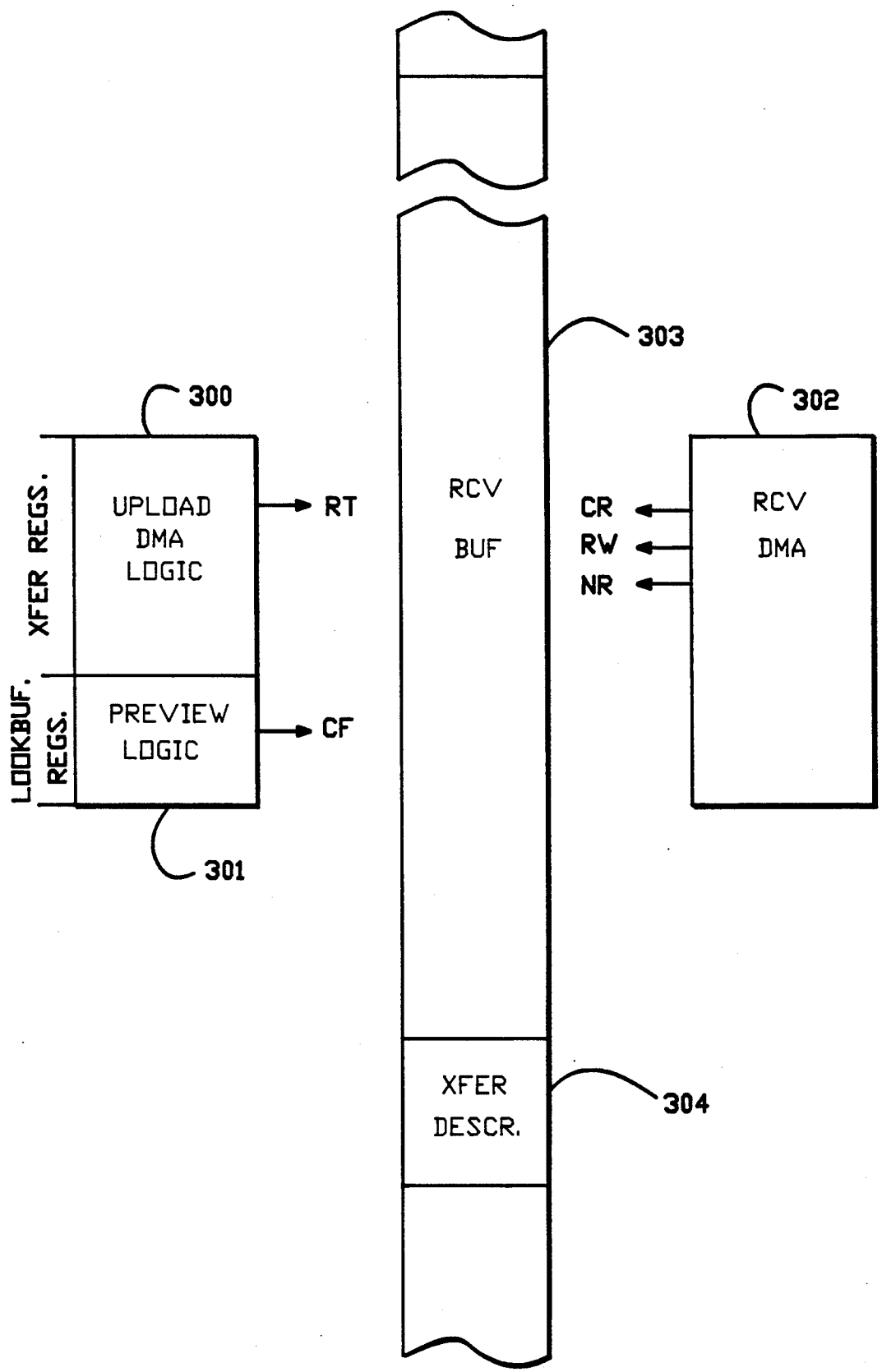
FIG. 12 is a heuristic diagram illustrating the operation of the receive ring buffer and a transfer descriptor buffer, along with pointers generated by the host and network interfaces to manage these buffers.

FIG. 12 is a heuristic diagram of the host interface logic and the network interface logic which is involved in the receive function. The host interface logic includes the upload DMA logic 300 and the view logic 301. The upload DMA logic 300 interfaces with the host through the XFER address block described below. The view logic 301 interfaces with the host through LOOKBUF and related address blocks described below.

The network interface logic includes the receive DMA logic 302. Both the host interface logic and network interface logic interface with the receive ring buffer area 303 in the host independent adapter memory. Also, the upload DMA logic 300 interfaces with the transfer descriptor area 304 within the host independent adapter memory.

This logic is also responsible for maintaining the receive buffer ring. Thus, a plurality of pointers are involved. The upload DMA logic generates a receive tail pointer RT which points to the base address of a frame being uploaded, which is also the tail end of the ring. The view logic generates a current frame pointer CF which points to the base address of LOOKBUF in the adaptor memory, or a frame being viewed by the view logic 301.

The receive DMA logic 302 generates a current receive pointer CR, pointing to the base address of a frame being received, a receive write pointer RW pointing to a location where data in the current frame is being written. The receive DMA logic 302 also generates a next receive pointer NR which points to the starting position of a next receive frame during status posting.

An understanding of the receive process can be gained from an understanding of the host address map involved.

A. LOOKBUF

The LOOKBUF register is used by the host to examine and/or transfer received frames. (Read only, 2036 bytes, 509 32 bit words.)

The host can use the LOOKBUF register to examine all of part of a received frame. The reads may be of any width and in any order. LOOKBUF uses the least significant eleven address bits of the host's address bus to select the bytes being accessed. The host can examine a portion of the frame and then use the bus master capabilities of the upload DMA logic 300 to transfer the remaining portion of the frame. Alternately, the host can both examine the frame and transfer the contents to the host memory using memory move instructions.

The received frames are always aligned within LOOKBUF such that the destination address field begins at byte zero of the register. The host cannot assume anything about the data read beyond the end of the current frame. The next receive frame is not guaranteed to be there. The host must use a write to RCV DONE to advance LOOKBUF to the next receive frame buffer.

B. RCV BYTES AVAIL

RCV BYTES AVAIL returns the number of valid bytes in LOOKBUF. (Read only, 4 bytes, 1 32 bit word.)

This register provides a running count of the number of bytes that have been received for the current frame. The maximum value to which this register may count is bounded by the value a register RCV MAX AVAIL (not described further).

When read as bytes, the register will store the value of bits 10 through 8 when bits 7 through 0 are read. This ensures integrity of the read of this dynamic register.

C. RCV DONE

RCV DONE allows LOOKBUF to advance to the next frame. (Write only, 4 bytes, a 32 bit word.)

A write of an arbitrary value to the least significant byte of this register will cause LOOKBUF to advance to the next receive frame (if any). RCV BYTES AVAIL, RCV FRAME SIZE and RCV FRAME STATUS are all similarly updated.

The frame that was in LOOKBUF at the time that RCV DONE was written to cannot be restored to LOOKBUF. The adapter will preserve the frame both in its internal receive buffer and in LOOKBUF until RCV DONE is eventually written to. Although the data in LOOKBUF is no longer visible once RCV DONE is written to, any data transfers that were initiated by writing to XFER AREA will complete successfully. The received frame's data will be preserved until the data transfer completes.

D. RCV FRAME SIZE

RCV FRAME SIZE returns the size of the current receive frame. (Read only, 4 bytes, 1 32 bit word).

RCV FRAME SIZE returns the size (in bytes) of the current receive frame in the lower 16 bits and the MACID value in the upper 16 bits. The length value is not posted and is therefore invalid until the adapter has completed reception of the frame. While the adapter is in the process of receiving the frame, the register will return XXXX0000(hex) where XXXX is the MACID value written to the MACID register.

This length value will remain valid until the host writes to RCV DONE. When a RCV DONE is issued, the least significant 16 bits of this register return to 0(hex). The length value is computed by counting all of the bytes from the first byte of the destination address field to the last byte of the data field, inclusive.

If an indication to the host is generated before the entire frame is received, the frame's size will be posted in this register at the completion of frame reception regardless of the final status of the received frame. The RCV FRAME STATUS register should be examined to determine if the frame was received without errors. This register may contain an incorrect value for frames that are received with errors (such as OVERSIZED FRAME).

E. RCV FRAME STATUS

RCV FRAME STATUS returns the status of the current receive frame. (Read only, 4 bytes, 1 32 bit word.)

RCV FRAME STATUS returns the condition of the current receive frame. This status is not posted, and is therefore invalid, until the adapter has completed reception of the frame.

The bits in this register are defined as follows:

| | |
|---|---|
| bit 0 | DMA OVERRUN |
| bit 1 | ALIGNMENT ERROR |
| bit 2 | BAD CRC |
| bit 3 | RUNT FRAME |
| bit 4 | OVERSIZED FRAME |

The contents of this register become valid immediately after the completion of the reception process and remain valid until the host writes to RCV DONE. If the adapter is configured to transfer the frame data to the host as it is being received and the frame is received with an error, the adapter will abort the bus master DMA sequence and return an error code to the host regarding the completion of the transfer. The host can at that time read RCV FRAME STATUS to determine if the frame was indeed defective.

In the event of a receive failure, and if the adapter is either configured to receive bad frames or it is enabled to transfer frames during reception, the host must write to RCV DONE to free up the receive buffer on the adapter.

If the adapter generates an EARLY RCV indication or the LENGTH LEFT THRESH register causes a RCV COMPLETE indication, the adapter will receive the frame and post the receive status regardless of whether or not the frame was received with errors even if the adapter is not configured to receive bad frames. In this event, a write to RCV DONE must occur to acknowledge the receive and to discard the frame.

Reading this register acknowledges RCV COMPLETE.

F. XFER AREA

The XFER AREA register is used to supply the adapter with buffer pointers for the transfer of received frames. (Write only, 1,024 bytes, 256 32 bit words).

The purpose of this register is to tell the adapter where in the host memory system the "current" receive frame should be transferred. This is accomplished by writing one or more sets of pointers to this register.

XFER AREA is a write only register that uses the least significant eleven bits of the host's address bus to determine the function of each parameter. The transfer specification must be written to XFER AREA using the structure of FIG. 7.

The actual data transfer is initiated by a read from XFER QUEUE STATUS. If the adapter was able to accept the transfer request without running out of RAM, then the adapter will begin transferring data to the host's memory. If the adapter runs out of memory in its transfer queue buffer, any additional writes to XFER AREA will be ignored. The host must resubmit any rejected transfer requests.

The "current" receive frame is defined as that receive frame that is presently available to the host via LOOKBUF. Receive frames are handled in the same order that they are received from the network. Once discarded by the host, a received frame may not be examined nor may a transfer be set up for it.

Received frames are disposed of by writing to RCV DONE. Until that write occurs, the current frame remains in LOOKBUF and may be transferred to the host an unlimited number of times. Once disposed of, the frame may not be examined or transferred. The disposal occurs immediately unless a transfer is in progress. If a transfer is in progress, then the disposal of the frame will not occur until the completion of the transfer.

G. XFER COMPLETE THRESH

XFER COMPLETE THRESH provides for an early transfer complete indication based on bytes left to transfer. (Read/write, 4 bytes, 1 32 bit word.)

The XFER COMPLETE THRESH register is used to specify the number of bytes from the end of the frame that must be transferred to the host by the adapter before it will generate a XFER COMPLETE indication to the host. When the number of bytes remaining to be transferred is equal to or less than the value in XFER COMPLETE THRESH, the XFER COMPLETE indication will be set (if not masked). Only bits 10 through 0 are implemented in this register. However, values greater than the maximum frame length will prevent this function from operating properly. The preferred method for disabling this function is to set the register to zero.

If the XFER COMPLETE THRESH condition is met while the frame being transferred is still being received, XFER COMPLETE is suppressed until the frame is received. If XFER COMPLETE is suppressed in this manner, LENGTH LEFT THRESH will override the value in this register and will be used to generate an early XFER COMPLETE indication.

If the frame is fully received when the transfer is initiated, then the transfer length is the lesser of the actual frame length and the number of bytes requested to be transferred via XFER AREA. If the frame is still being received when the transfer is initiated, then its length is assumed to be the value of the length field plus 14. If the value of the length field is greater than 1,500, but not equal to 8137(hex) (i.e., a special frame type identifier), then the frame length is assumed to be 1500 bytes. Finally, if the length field contains 8137(hex), then byte 17 and 18 of the receive frame will be assumed to contain the frame's length value. This assumed length will be changed when the frame is entirely received to the lesser of the actual frame size and the number of bytes requested to be transferred.

This value can be tuned by the host as it determines how often it is responding too early to the transfer complete indication versus how often it is arriving late or on time. If the host is responding too early, XFER STATUS will return a ff(hex) indicating that the status is undefined and that the transfer will be completed shortly. This register is set to 0 during a reset.

H. XFER STATUS

XFER STATUS returns the status of a receive frame transfer. (Read only, 4 bytes, 1 32 bit word.)

Reading this register will return the status of the receive frame transfer attempt. The possible return values are 0(hex) for success, a(hex) for failure, and ff(hex) for unknown. XFER STATUS is set to ff(hex) while a transfer is in progress. Transfer failures can be caused by excessive wait states encountered on the host bus or by the receive frame being defective. Reading this register will acknowledge (reset) XFER COMPLETE in an INDICATION REASON register.

VI. Receive Indication

In one embodiment of the present invention, the network adapter has two types of receive threshold logic. The receive threshold logic generates an early indication signal based on an amount of data received from the network. The first receive threshold logic or look-ahead threshold logic generates an early indication signal based on how many bytes of a data frame has been received. The second threshold indication logic or length-left threshold logic generates an early indication signal based on how many bytes of a data frame remains to be received.

FIGS. 13a–b represents a typical ethernet data frame. As can be seen from FIG. 13, the data frame includes a preamble field, a destination address field, a source address field, a length/type field, a data field and a Cyclic Redundancy Check (CRC) field. The preamble is a 64-bit synchronization pattern containing alternating one and zeros, ending with two consecutive ones. The destination address field contains 48 bits specifying the stations to which the data frame will be transmitted. The source address field contains 48 bits containing the unique address of the station that is transmitting the data frame. The length/type field contains a 16-bit field identifying either the high level protocol associated with the data frame or the length of the data field which follows. The data field contains between 46 and 1,500 bytes of data. Finally, the CRC field contains 32 bits of cyclic redundancy check code. Minimum spacing between data frames is 9.6 $\mu$s. The CRC field covers the destination field, source field, type/length field, and data field.

FIG. 13a graphically shows when in the reception of the data frame the look-ahead threshold logic will generate an early receive indication. As can be seen from FIG. 13a, look-ahead threshold logic determines how many bytes of frame has been received before generating an early receive indication. The look-ahead threshold logic contains an alterable storage location containing the look-ahead threshold number of bytes to be received before generating the early indication signal. The value selected for the look-ahead threshold should be greater than the number of bytes necessary to read the header field. In addition, the value selected for the look-ahead threshold should be selected such that a reception of the entire frame is likely. In an ethernet network the probability an entire frame will be received without a collision is reasonably high after receiving the first 60 bytes of the frame.

Alternatively, the length-left threshold logic will generate an early indication signal to the host depending upon how many bytes of the data frame remains to be received. FIG. 13b graphically shows the relationship of the generation of the receive complete signal relative to the reception of a data frame. While the look-ahead threshold logic can be implemented by counting the number of bytes received in the data frame and comparing it to a look-ahead threshold value, the length-left threshold logic is more complex because the length of the data frame must be defined before comparisons to a threshold value. The length-left threshold logic must determine the length of the data frame in order to determine if the length-left threshold value has been reached on a real time basis of each data frame received.

FIG. 14 represents a logic flow diagram of how the length-left threshold logic determines the length of a data frame on a real time basis. On reception of the length/type field of the data frame, logic block 200 determines whether the length/type field contains a length value or type value. If the value in the length/type field is less than or equal to 1,500, the length-left threshold logic will use the value as the data field's length as in logic block 201. Alternatively, if the value in the length/type field is greater than 1,500, the logic will determined whether the value is a type identifier in logic block 202. If the type identifier equals 8137(hex) then the threshold logic transitions to logic block 203 which determines that the data frame is a NetWare ® frame which uses bytes 17 and 18 for containing the data field's length. Otherwise, the threshold logic transitions to logic block 204 and assumes the data field is 1500 bytes.

The host may dynamically tune when the early receive indications will be generated based on previous host responses by altering the look-ahead and length-left threshold values. This tuning will further reduce interrupt latency of the host processor. The host, and more specifically the host driver, must determine whether the interrupt occurred too early or too late by examining the network adapter's status registers. The host processor then may increase or decrease the threshold value in the receive threshold logic by writing to the threshold register.

A binary exponentially accelerating track method may be used by the host processor to tune the generation of the network adapter's early indications. The preferred algorithm for dynamically tuning the receive threshold logic follows:

1. Use latency period defaults.

An initial interrupt latency default of 15 µs is used for DOS systems, while 30 µs is used for OS/2 systems. The number of microseconds expected for the interrupt latency is then converted to byte times. The conversion factor depends on the mode of the adapter, network data rate and host system bus rate.

2. Determine if interrupt occurred early or late.

Upon entering the interrupt service routine, the network adapter FRAME STATUS register should be examined to determine if the frame has actually completed reception. The FRAME STATUS register will indicate whether the interrupt occurred too early or too late.

3. Determine the latency delta.

If the current interrupt and the previous interrupt occurred on the same side of the event (both early or both late), then the latency delta is doubled (multiplied by 2). If the current interrupt occurred on the opposite side of the event (early versus late), then the delta is reset to 1 and has its sign changed. For example, if the current delta is plus 64, then the new delta will be minus 1; if the current delta is negative 32, then the new delta will be plus 1. This assures that if the algorithm overshoots the mark, it will stop and begin to accelerate in the opposite direction.

4. Update threshold value.

Finally, the latency delta is added to the contents of the alterable storage location containing the threshold value. The algorithm then returns to step 2.

The above algorithm may be used for tuning of other threshold logic embodiments which follow.

A. LOOK AHEAD AND LENGTH LEFT THRESHOLD LOGIC

In the present embodiment, receive indication logic is implemented in Receive DMA Block 63 of FIG. 5. Among other functional blocks, Receive DMA Block 63 includes a receive indication function shown in FIG. 15. The receive indication functional block diagram of FIG. 15 includes look-ahead and length-left threshold logic.

The major functional logical blocks of the receive indication function include RCV COMPLETE CONTROL block 210, LENGTH FIELD register 212, LENGTH LEFT THRESH counter 216, LENGTH LEFT THRESH register 221, LOOK AHEAD THRESH register 223, and EARLY RCV CONTROL block 225.

RCV COMPLETE control block 210 outputs RCV COMPLETE based on a variety of input signals. Those input signals include RCV DONE REG WR, XFER INDICATE DELAY EN, XFER COMPLETE, RCV FRAME STATUS RD, DISCARD CURRENT, XFER QUEUE STATUS RD, CUR FRAME IS CUR RCV, CLOCK, RECEIVE DMA RESET, LENGTH LEFT THRESH EN, and LENGTH LEFT THRESH MET.

The value of LENGTH LEFT THRESH MET and LENGTH LEFT THRESH EN depend on the length-left threshold logic. END OF RCV and RCV DMA RESET are inputs to OR gate 211. The output of OR gate 211 is then used to set LENGTH FIELD register 212. LENGTH FIELD register 212 is used to condition the LENGTH FIELD VALUE in a given data frame outputting CONDITIONED LENGTH FIELD [10:0] from the Q output. LENGTH FIELD [15:0] are the D inputs of the LENGTH FIELD register 212 with LENGTH FIELD WR clocking the register.

RCV DMA RESET is also used to reset register 214, register 220, and LENGTH LEFT THRESH counter 216. Register 214 and 220 with LENGTH LEFT THRESH counter 216 are synchronized by the CLOCK signal. The RECEIVING signal is inputted to the D input of register 214. The Q output of register 214 is then inputted to AND gate 215 with the RECEIV- ING signal. The output of AND gate 215 then drives the PE input of the LENGTH LEFT THRESH counter 216. The value of RCV FRAME LENGTH [3:0] is compared to 15 by logic block 219 which then drives the J input of register 220. The Q output of register 220 is then inputted to the AND gate 217 along with RCV READ BAR. The output of AND gate 217 then drives the CE input of LENGTH LEFT THRESH counter 216.

LENGTH LEFT THRESH register 221 contains the length-left threshold value. RCV DMA RESET resets register 221 with LENGTH LEFT THRESH WRHI and LENGTH LEFT THRESH WRLO clocking register 221. HOST WRITE DATA [10:0] writes the threshold value into LENGTH LEFT THRESH register 221. The LENGTH LEFT THRESH REGISTER value is then outputted from Q to the D input of LENGTH LEFT THRESH counter 216 and logic block 218. If the Q output of LENGTH LEFT THRESH register 221 is greater or equal to 1, the LENGTH LEFT THRESH EN is asserted from logic block 218 to RCV COMPLETE CONTROL block 210.

LENGTH LEFT THRESH counter 216 then outputs the number of bytes received from a data frame from its Q output into the B input of comparator 213. Comparator 213 then outputs LENGTH LEFT THRESH MET to RECEIVE COMPLETE CONTROL block 210 when the output of LENGTH LEFT THRESH counter 216 equals or exceeds the conditional LENGTH FIELD [10:0] value.

EARLY RCV CONTROL block 225 asserts EARLY RCV based on its inputs. EARLY RCV CONTROL block 225 inputs are CUR FRAME IS CUR RCV, END OF RECEIVE, RCV DMA RESET, CLOCK, RCV BYTES AVAIL RD, LOOK AHEAD THRESH EN, and LOOK AHEAD THRESH MET.

LOOK AHEAD THRESH register 223, as LENGTH LEFT THRESH register 221, contains a threshold value. LOOK AHEAD THRESH register 223 is set by RCV DMA RESET with HOST WRITE DATA [10:0] entered into the D input with LOOK AHEAD THRESH WRHI and LOOK AHEAD THRESH WRLO clocking the LOOK AHEAD THRESH register 223. The LOOK AHEAD THRESH register 223 Q output is entered to comparator 224 along with RCV FRAME LENGTH [10:0]. Comparator 224 then asserts LOOK AHEAD THRESH MET when RCV FRAME LENGTH [10:0] is greater than or equal to the Q output of LOOK AHEAD THRESH register 223. The Q output of LOOK AHEAD THRESH register 223 is also inputted to logic block 222, which asserts LOOK AHEAD THRESH EN to EARLY RCV CONTROL block 225 if the Q output of LOOK AHEAD THRESH register is greater than or equal to 1.

Figure 15:
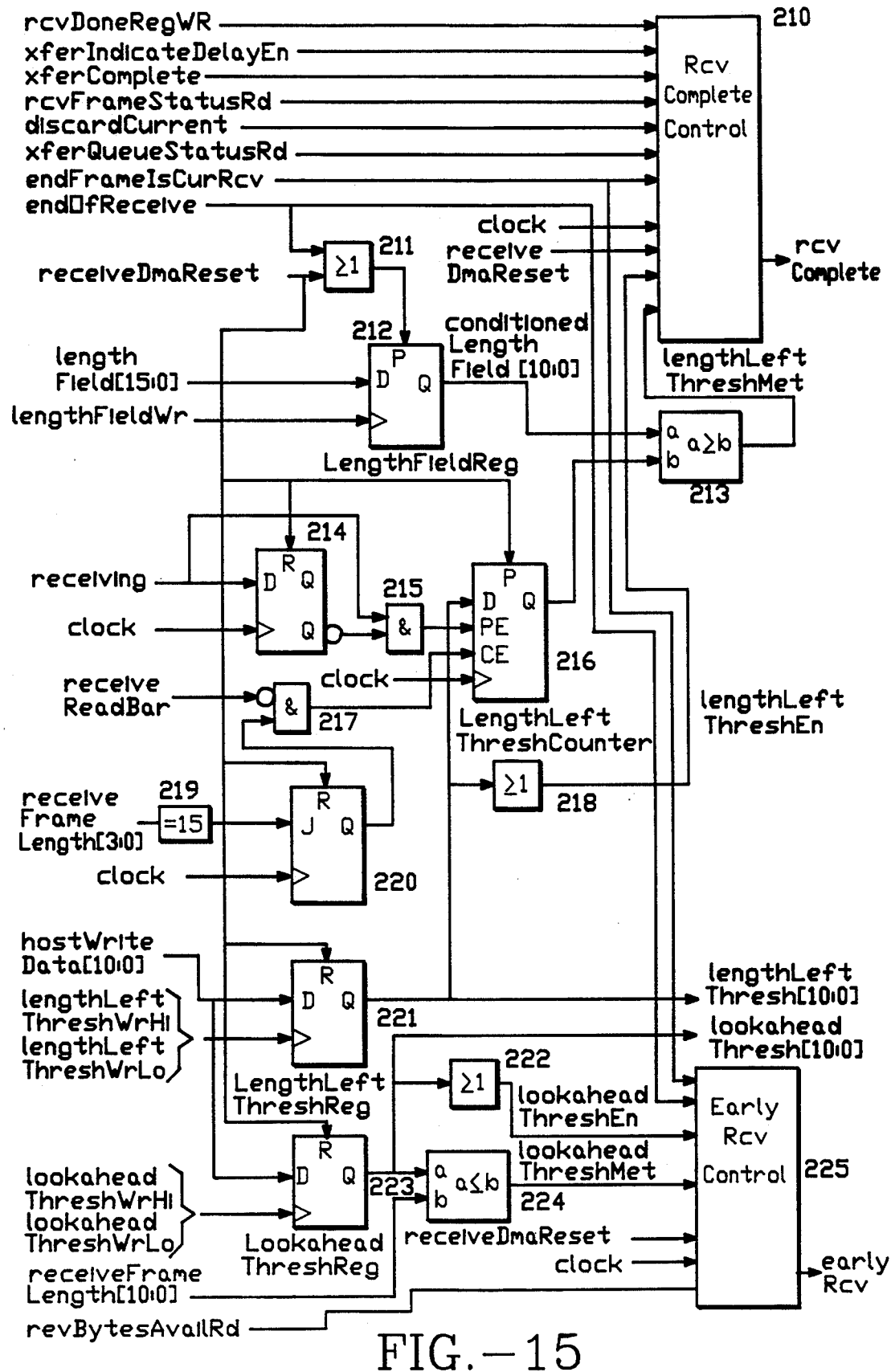
FIG. 15 is a receive indication functional block diagram of the receive indication function in the receive DMA block of FIG. 5.
Figure 16A:
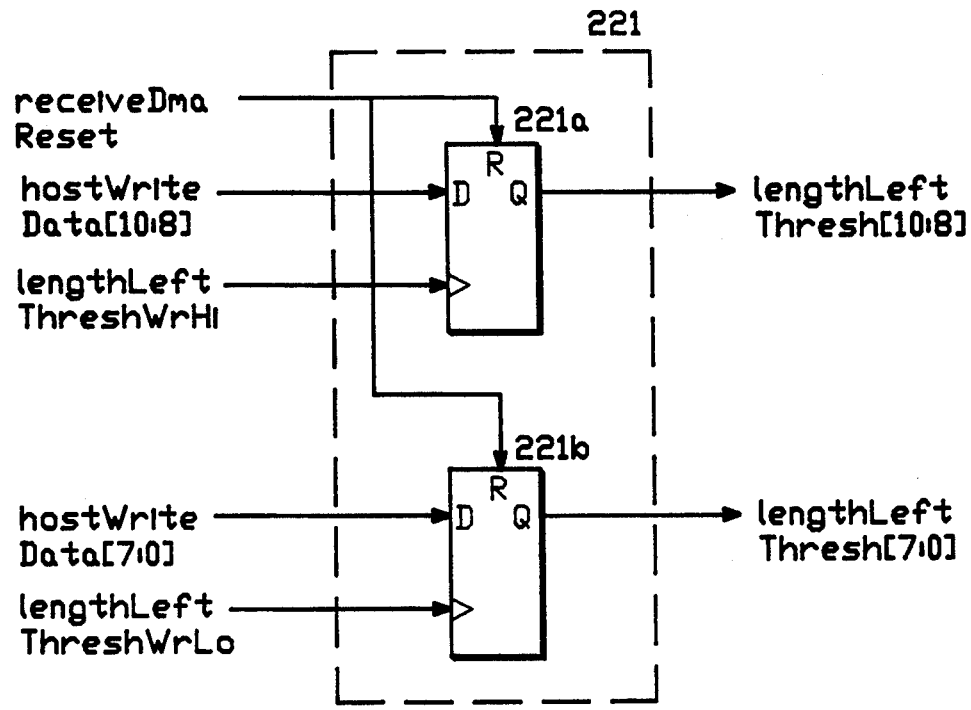
FIGS. 16a–b are length-left threshold and look-ahead threshold register schematics of FIG. 15.
Figure 16B:
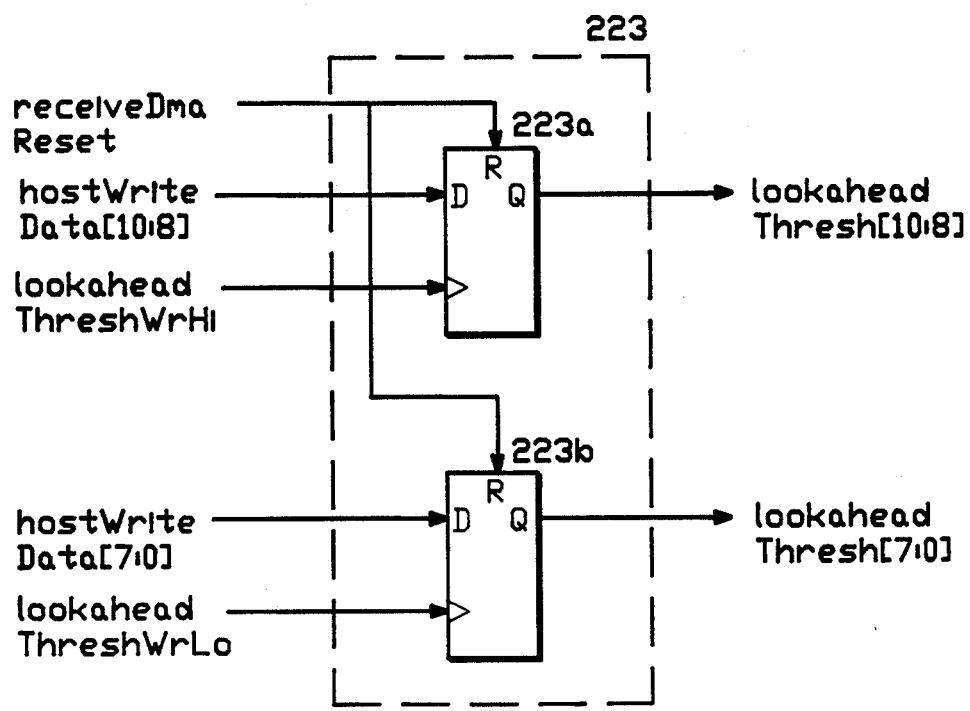

FIGS. 16a and 16b are the register configurations of LENGTH LEFT THRESH register 221 and LOOK AHEAD THRESH register 223 of FIG. 15. These D-type flip-flop registers store the LENGTH LEFT THRESH value and the LOOK AHEAD THRESH value, respectively.

Top register 221a in FIG. 16a stores the upper three bits HOST WRITE DATA [10:8] written by the host to the D input on the rising edge of LENGTH LEFT THRESH WRHI. The bottom register 221b stores the lower eight bits HOST WRITE DATA [7:0] written by the host to the D input on the rising edge of LENGTH LEFT THRESH WRLO. The registers are reset by RECEIVE DMA RESET at the R inputs. The value of LENGTH LEFT THRESH is read from the Q outputs with the upper three bits LENGTH LEFT THRESH [10:8] read from register 221a and the lower 8 bits LENGTH LEFT THRESH [7:0] read from register 221b.

Likewise, in FIG. 16b, LOOK AHEAD THRESH register 223 stores the LOOK AHEAD THRESH value. Top register 223a in FIG. 16b stores the upper three bits HOST WRITE DATA [10:8] written by the host to the D input on the rising edge of the LOOK AHEAD THRESH WRHI. The bottom register 223b stores the lower eight bits HOST WRITE DATA [7:0] written by the host to the D input on the rising edge of LOOK AHEAD THRESH WRLO. The registers are reset by RECEIVE DMA RESET at the R input. The value of LOOK AHEAD THRESH is read from the Q outputs with the upper three bits LOOK AHEAD THRESH [10:8] read from register 223a and the lower 8 bits LOOK AHEAD THRESH [7:0] read from register 223b.

Figure 17:
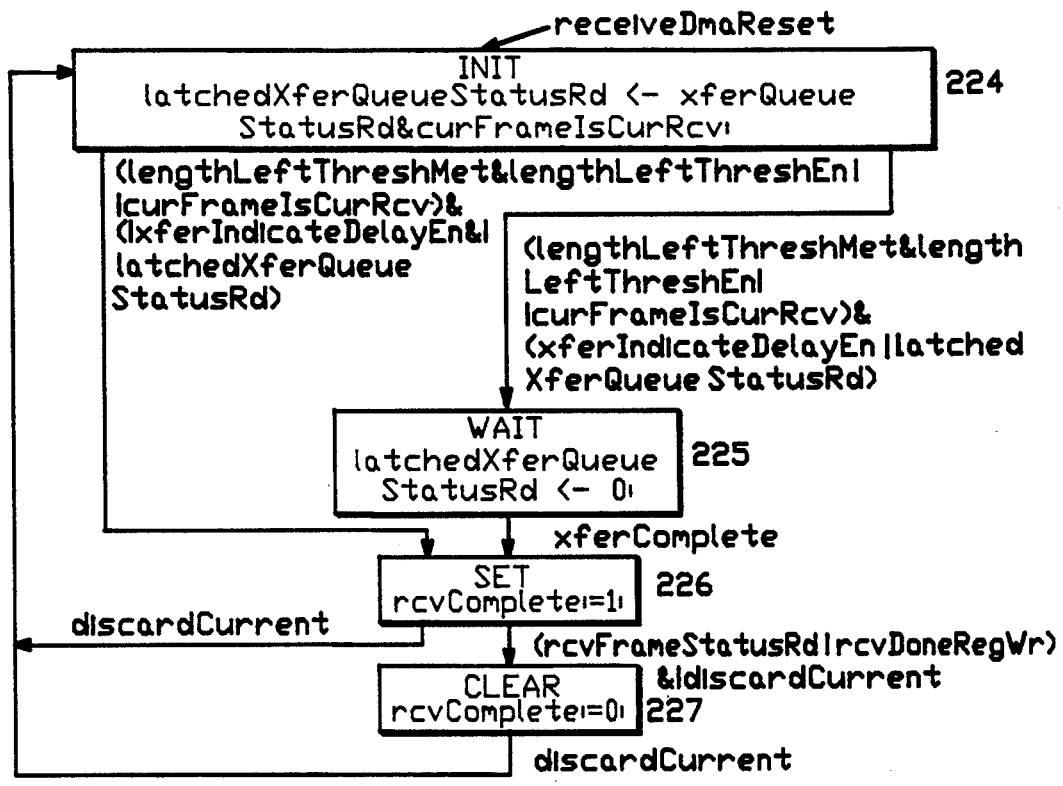
FIG. 17 is a receive complete control state machine diagram of the receive complete control block of FIG. 15.

FIG. 17 is a RECEIVE COMPLETE CONTROL state machine diagram of the RECEIVE COMPLETE CONTROL block of FIG. 15. The RECEIVE DMA RESET signal allows transition into INIT state 224. After initialization, it waits for the threshold condition to become true or for a complete frame to be in the receive buffer. If XFER INDICATE DELAY EN is non-zero or if the host initiates a frame transfer by reading XFER QUEUE STATUS, then the state machine goes into the wait state 225 when the LENGTH LEFT THRESH condition is crossed or when a complete receive frame is in the receive buffer. It must wait for XFER COMPLETE, in the WAIT state 225, before asserting RCV COMPLETE; however, if the host wishes to discard the frame based on the earlier receive data by writing to RCV DONE the state machine will go back to INIT state 224 and RCV COMPLETE will be suppressed in CLEAR state 227.

Alternately, if XFER INDICATE DELAY is zero and if the host has not initiated an transfer by reading XFER QUEUE STATUS, then the state machine can go directly into the SET state 226 and assert RCV COMPLETE without waiting for XFER COMPLETE.

After it has been set, RCV COMPLETE will be cleared by CLEAR state 227 when the host acknowledges the indication by reading RCV FRAME STATUS or by writing to RCV DONE. When DISCARD CURRENT is asserted, which indicates that the current frame pointer [14:2] has advanced to the beginning of the next frame, the state machine moves back to the INIT state 224.

Figure 18:
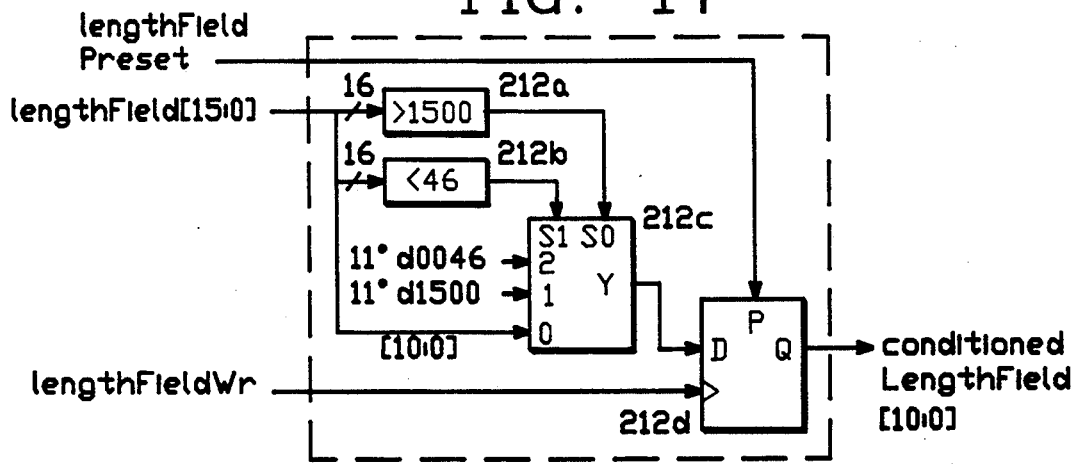
FIG. 18 is a length field register schematic of the length field register of FIG. 15.

FIG. 18 is a LENGTH FIELD register schematic of FIG. 15. The LENGTH FIELD register 212 stores the CONDITIONED LENGTH FIELD [10:0] to be used for determining LENGTH LEFT THRESHOLD MET. The value stored is restricted to a lower limit of 46 and an upper limit of 1,500. The value of the LENGTH FIELD [15:0] is limited by the output of logic block 212a and 212b which are used to select the output of MUX 212c. The S1 and S0 inputs of MUX 212c determine the CONDITIONED LENGTH FIELD [10:0] value outputted. The output of logic block 212a is set if LENGTH FIELD [15:0] is greater than 1,500. S1 is set by logic block 212b if LENGTH FIELD [15:0] is less than 46. The CONDITIONED LENGTH FIELD [10:0] is written into the O input of the register 212c. If the value is less than 46, then a value of 46 is written into the D input of register 212d, and if the value is greater than 1,500, then the value of 1,500 is written into the D-input register 212d. D-type register 212d is reset by LENGTH FIELD PRESET at the P input. The writing to the 212d register is synchronized by LENGTH FIELD WR.

Figure 19:
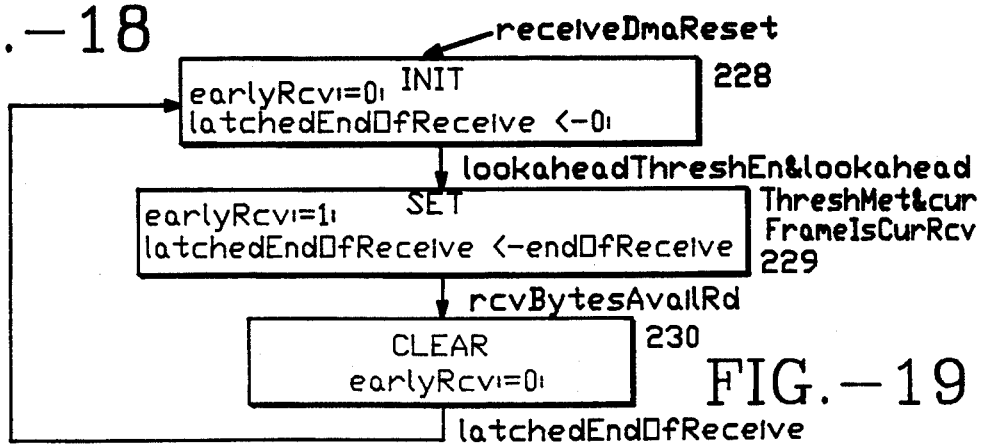
FIG. 19 is an early receive control state machine diagram of the early receive control block of FIG. 15.

FIG. 19 is an EARLY RCV CONTROL state machine diagram of the EARLY RCV Control block of FIG. 15. The RECEIVE DMA RESET signal allows transition into the INIT state 228 where EARLY RCV is cleared. When the LOOK AHEAD THRESH EN, LOOK AHEAD THRESH MET, and CUR FRAME IS CUR RCV are asserted, EARLY RCV will be set in SET state 229. LOOK AHEAD THRESH EN is asserted when LOOK AHEAD THRESH is non-zero, and LOOK AHEAD THRESH MET is asserted when the number of bytes successfully received is equal to or greater than the threshold set in LOOK AHEAD THRESH. In CLEAR state 230, EARLY RCV is cleared when the host reads RCV BYTES AVAIL. The state machine stays in CLEAR state 230 until LATCHED END OF RECEIVE is observed.

VII. Indication Combination Logic

As with the receive threshold logic which generates early receive interrupts, a transfer complete interrupt may be generated when a complete frame of data is transferred from the adapter buffer memory to the host memory. However, indication combination logic may delay the normal transfer complete interrupt to occur slightly before an expected occurrence of the early receive interrupt.

Figure 20:
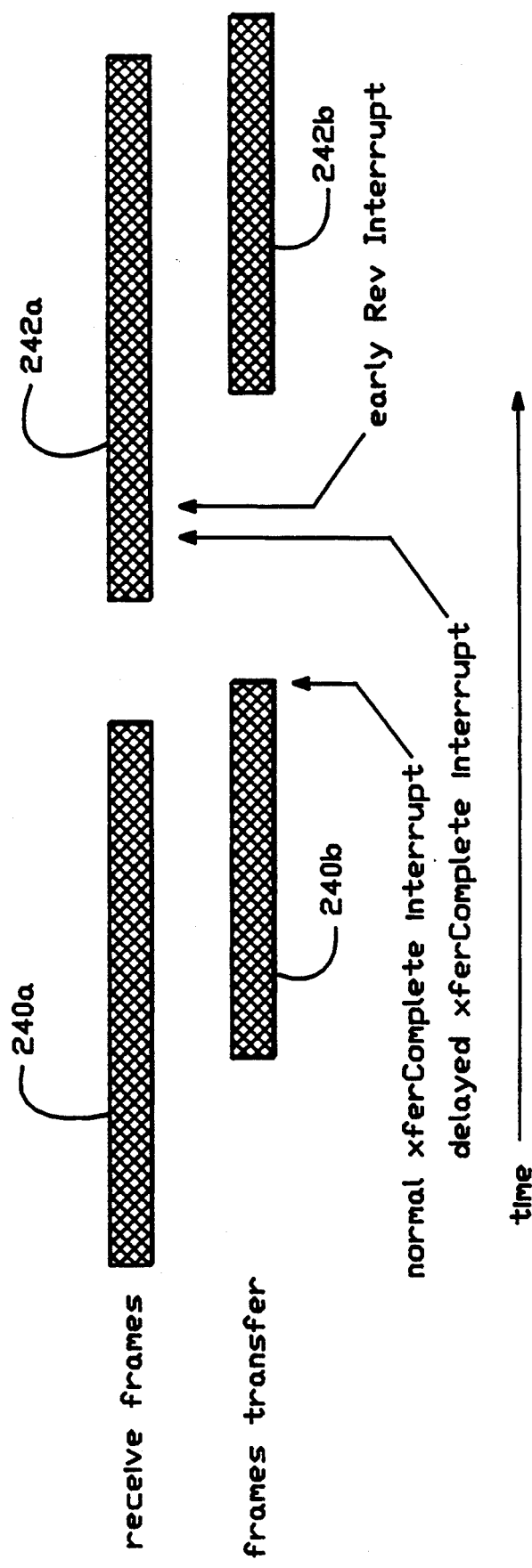
FIG. 20 illustrates a receive frame and transfer frame time line with typical indications.

FIG. 20 illustrates the receiving and transferring of frames by the network adapter. FIG. 20 shows the overlap of receiving frame 240a and transferring frame 240b. As can be seen, a normal transfer complete interrupt is generated at the end of transfer frame 240b. However, a network adapter with early receive indication logic generates an interrupt shortly after the normal transfer complete interrupt. Both interrupts are generated in a relatively short period of time reducing network adapter/host processor performance. In order to reduce the amount of interrupts, the normal transfer complete interrupt of frame 240b may be delayed to before the expected occurrence of early receive interrupt of frame 242a. This delay of the transfer complete interrupt of frame 240b will allow the host processor to service two indications in one interrupt service routine. The host processor will enter its interrupt service routine caused by the delayed transfer complete interrupt and before exiting will examine the network adapter status registers to read the early receive indication and also service the early receive indication. Thus, the indication combination logic enables a substantial reduction in the number of interrupts to the host processor during multiple frame transfers from the network adapter to the host system.

The upload indication functional block in upload DMA block of FIG. 5 contains the indication combination logic. After certain conditions have been met, the upload indication function asserts XFER COMPLETE and posts status information in XFER INDICATION REASON. When XFER COMPLETE is asserted, the status in XFER INDICATION REASON becomes valid, and stays valid until the host reads XFER LENGTH. The bits of XFER INDICATION REASON posts status information which described when the XFER COMPLETE was generated. The upload indication function deasserts XFER COMPLETE when the host processor has acknowledge the indication by reading XFER LENGTH. The upload indication block contains three host accessible registers: XFER INDICATION REASON, XFER COMPLETE THRESH, and XFER INDICATE DELAY. The host has read access to all three registers and write access to XFER COMPLETE THRESH and XFER INDICATE DELAY. XFER COMPLETE can be programmed to be asserted before the completion of transfer, after the completion of transfer, or when the early receive indication for the frame being received is expected.

XFER COMPLETE is controlled by a state machine that is shown in FIG. 21. UPLOAD DMA RESET causes the upload indication block to enter the INIT state 304. XFER COMPLETE, XFER INDICATION REASON and XFER INDICATE DELAY EN are cleared in INIT state 304. The state machine transitions to WAIT FOR XFER THRESH MET state 305 upon the assertion of TRANSFERRING. If the value of XFER INDICATE DELAY is zero and the frame being transferred is not being received when XFER THRESH MET is asserted, XFER COMPLETE is asserted by transitioning to SET state 309. If the current frame being transferred is also the current frame being received, the assertion of XFER COMPLETE is delayed until when the next receive frame is expected by transitioning into TIMER state 306. Assuming minimum IFS (Inter-Frame Space), time from the end of one receive frame from the beginning of the next receive frame is determined by the following equation:

$$9.6 \ \mu s(IFS) + 6.4 \ \mu s(preamble) + 0.8 \ \mu s(\text{first byte of Destination Address field}) + 0.8 \ \mu s(\text{synchronization}) = 17.6 \ \mu s.$$

If a new frame is not being received at the expected time by the assertion of RECEIVING, XFER COMPLETE is asserted by SET state 309 after 17.6 μs. RECEIVING is asserted when a frame is being received by RECEIVE DMA. The assertion of RECEIVING is used to indicate the beginning of a frame, and the deassertion of RECEIVING is used to indicate the end of the frame. If RECEIVING is not asserted, XFER COMPLETE is further delayed until the destination address of the new receive frame has been checked in WAIT FOR ADDR MATCH state 307. If the destination address does not match and the frame is not going to be received because of the assertion of REJECT FRAME, XFER COMPLETE is asserted by SET state 309. Otherwise, WAIT FOR XFER DELAY MET state 308 occurs on the assertion of DELAYED MULTICAST COMPARE DONE. DELAY MULTICAST COMPARE DONE is the MULTICAST COMPARE DONE delayed by one clock cycle. REJECT FRAME lags MULTICAST COMPARE DONE by one clock so it becomes valid when the DELAY MULTICAST COMPARE DONE is asserted. Finally, when XFER DELAY MET is asserted, the state machine transitions to SET state 309.

FIGS. 22a–d also show the timing diagrams of the different sequences of when XFER COMPLETE can be asserted. FIG. 21a shows the timing diagrams of the assertion of an early XFER COMPLETE indication. While a data frame is transferring to the host system, the XFER COMPLETE indication is asserted upon the assertion of the XFER COMPLETE MET and is deasserted upon the deassertion of the XFER LENGTH RD.

FIG. 22b shows the assertion of the XFER COMPLETE indication when a new frame has not been received. The assertion of XFER COMPLETE is delayed 17.6 microseconds until the expected occurrence of a new frame and is deasserted upon the deassertion of XFER LENGTH RD.

FIG. 22c illustrates a delayed transfer complete indication when a frame is received which does not have a correct address match. After 17.6 microseconds, the network adapter receives the new frame and determines whether the new frame has the network adapter destination address. If the current frame being received does not match the network adapter destination address, XFER COMPLETE will be asserted upon the assertion of DELAYED MULTICAST COMPARE DONE and REJECT FRAME. The transfer complete will then be deasserted upon the deassertion of XFER LENGTH RD.

FIG. 22d illustrates the delayed XFER COMPLETE indication after XFER DELAY MET is asserted. If the current frame being received has the network adapter destination address, then XFER COMPLETE occurs on the assertion of XFER DELAY MET and is deasserted on the deassertion of XFER LENGTH RD.

FIG. 23 is a XFER COMPLETE THRESH register schematic of the upload indication block. XFER COMPLETE THRESH is stored in register 315 and 316 in which the host has both read and write access. The top 3 bits of the transfer complete threshold value is written by HOST WRITE DATA [10:8] at the D input of the register 315. XFER COMPLETE THRESH WRHI strobe clocks the input. XFER COMPLETE THRESH [10:8] is output at the Q output of register 315. The bottom 8 bits of the transfer complete threshold value is written by HOST WR DATA [7:0] at the D input register 316. XFER COMPLETE THRESH WRLO strobe clocks the input. XFER COMPLETE THRESH [7:0] is output at the Q output of register 316. Registers 315 and 316 are reset to zero during initialization by UPLOAD DMA RESET.

The transfer complete threshold value in 315 and 316 is valid when the host has written to both 315 and 316. If only 315 and 316 has been written, XFER COMPLETE THRESH VALID will be deasserted to indicated that the threshold value is invalid.

This is accomplished by registers 310 and 313. XFER COMPLETE THRESH WRLO is inputted to the J input of register 310 while XFER COMPLETE THRESH WRHI is inputted to the J input of register 313. The K of registers 310 and 313 is received from AND gates 311 and 314. XFER COMPLETE THRESH WRHI, XFER COMPLETE THRESH WRLO, and XFER THRESH HI BYTE VALID are inputs to AND gate 311. XFER COMPLETE THRESH WRHI, XFER COMPLETE THRESH WRLO, and XFER THRESH LO BYTE VALID are inputs to AND gate 314. Registers 310 and 313 are synchronized by the CLOCK signal. The Q outputs of registers 310 and 313, XFER THRESH LO BYTE VALID and XFER THRESH HI BYTE VALID, respectively, are inputted to AND gate 312 which outputs XFER COMPLETE THRESH VALID.

FIG. 24 is a XFER DELAY MET register schematic of the upload indication block. XFER DELAY MET is asserted when the number of bytes received in CUR BYTE COUNT [10:0] plus the value of XFER INDICATE DELAY [10:0] is greater than or is equal to the value of LOOK AHEAD THRESH [10:0]. CUR BYTE COUNT [10:0] and XFER INDICATE DELAY [10:0] is entered at the a and b input of adder 317 respectfully. The sum is then entered to the a input of comparator 318 with LOOK AHEAD THRESH [10.0] entered at the b input. The output of comparator 318 is then inputted to AND gate 320 with XFER DELAY RD, CYCLE DONE, XFER DELAY MET ENABLE and CLOCK. XFER LENGTH RD, along with feedback of XFER DELAY MET is inputted to And gate 319. And gates 319 and 320 are then inputted to OR gate 321. The output of OR gate 321 is then inputted to the D input of register 322. XFER DELAY MET is outputted from the Q output of register 322 with UPLOAD DMA RESET resetting the register with CLOCK signal synchronization. The values on XFER INDICATE DELAY [10:0], CUR BYTE COUNT [10:0], and LOOK AHEAD THRESH [10:0], can only change on the rising edge of CLOCK when CYCLE DONE is asserted. To insure the input to register 322 is valid, XFER DELAY MET is set when XFER INDICATE DELAY [10:0] plus CUR BYTE COUNT [10:0] is greater than equal to LOOK AHEAD THRESH [10:0] at the time when CYCLE DONE is asserted. When XFER LENGTH RD is asserted, XFER DELAY MET is reset.

Figure 25:
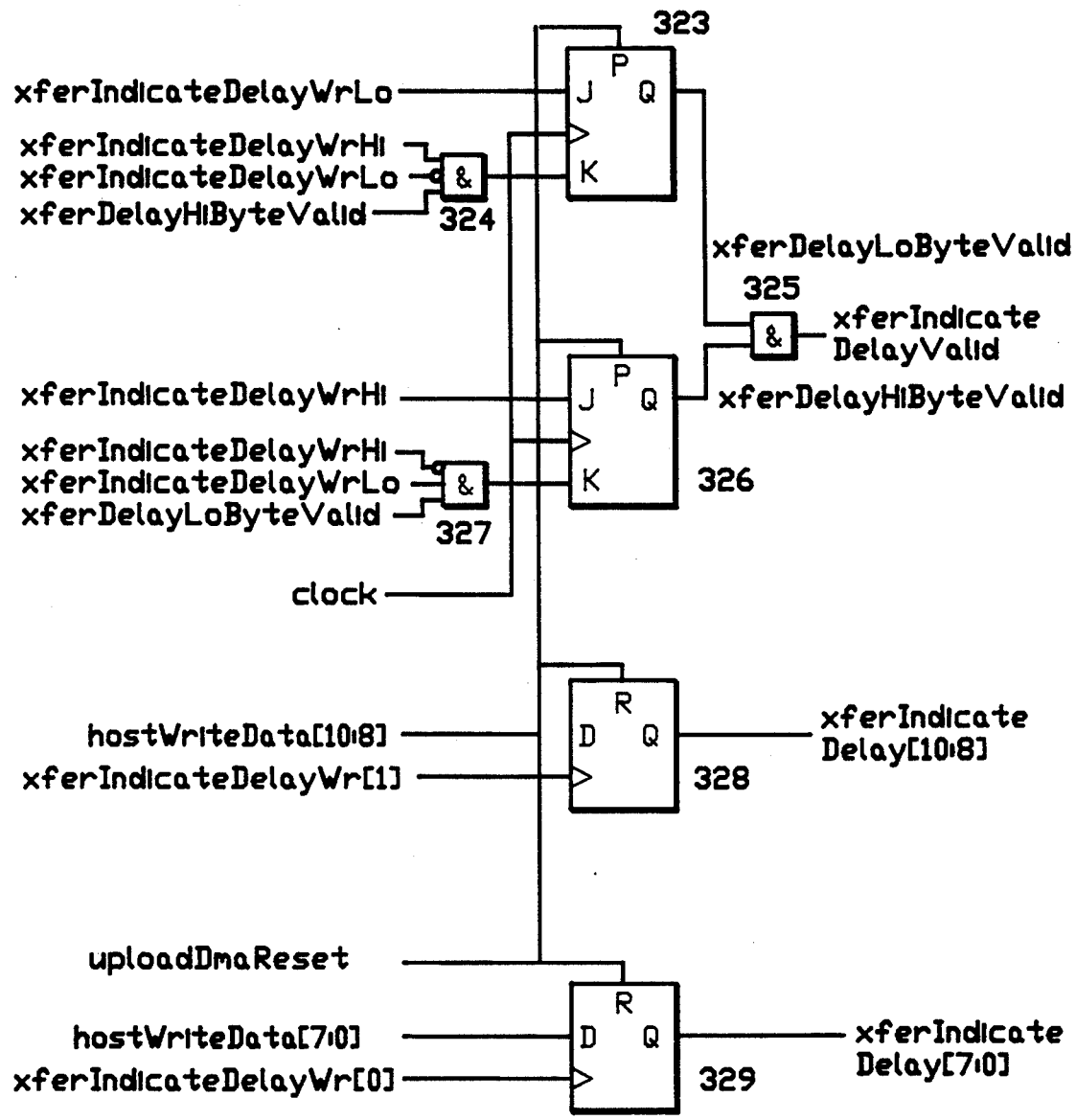
FIG. 25 is a transfer indication delay register schematic of the upload indication function in the upload DMA block of FIG. 5.

FIG. 25 is a XFER INDICATE DELAY register schematic of the upload indication block and has essentially the same architecture as the XFER COMPLETE THRESH register schematic of FIG. 23. XFER INDICATE DELAY is stored in registers 328 and 329 in which the host has both read and write access. This register is reset to zero during initialization by UPLOAD DMA RESET. The value in this register is valid when the host has written both to the low and high bytes of registers 328 and 329. If only either low or high bytes had been written, XFER INDICATE DELAY VALID will be deasserted to indicate threshold value is invalid.

This is accomplished by registers 323 and 326. XFER INDICATE DELAY WRLO is inputted to the J input of register 323 while XFER INDICATE DELAY WRHI is inputted to the J input of register 326. The K inputs of registers 323 and 326 are received from AND gates 324 and 327. XFER INDICATE DELAY WRHI, XFER INDICATE DELAY WRLO, and XFER DELAY HI BYTE VALID are inputs to AND gate 324. XFER INDICATE DELAY WRHI, XFER INDICATE DELAY WRLO, and XFER DELAY LO BYTE VALID are inputs to AND gate 327. Registers 323 and 326 are synchronized by the CLOCK signal. The Q outputs of registers 323 and 326, XFER DELAY LO BYTE VALID and XFER DELAY HI BYTE VALID, respectively, are inputted to AND gate 325 which outputs XFER INDICATE DELAY VALID if both XFER DELAY LO BYTE VALID and XFER DELAY HI BYTE VALID are set.

Figure 26:
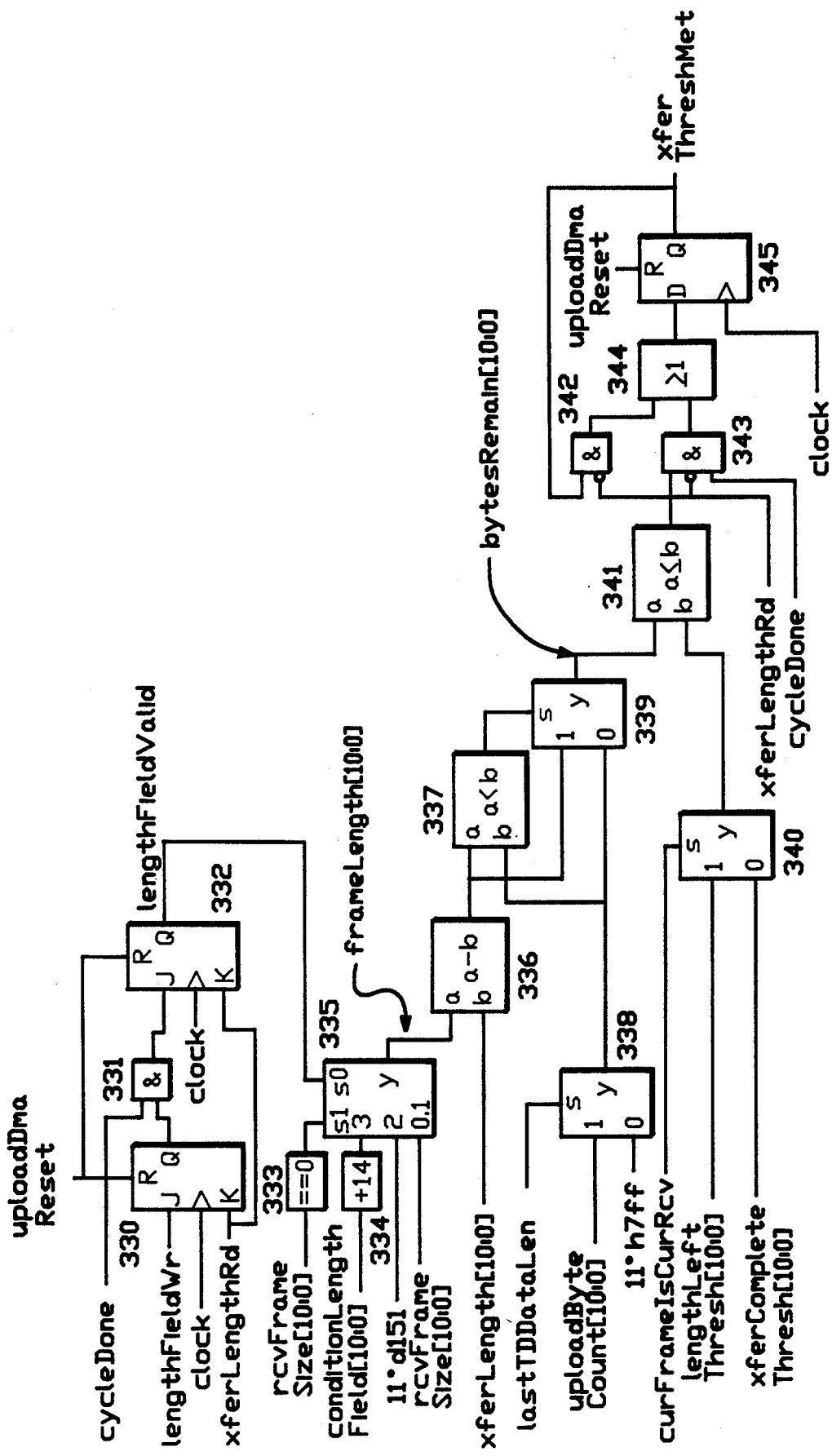
FIG. 26 is a transfer threshold met schematic of the upload indication function in the upload DMA block of FIG. 5.

FIG. 26 is a XFER THRESHOLD MET schematic of the upload indication block. FIG. 26 illustrates how XFER THRESH MET is generated. The XFER COMPLETE THRESHOLD is met when the number of bytes left to be transferred is less than or equal to the value of XFER COMPLETE THRESH . The number of bytes left to be transferred is determined by subtracting the number of bytes that have been transferred from the receive FRAME LENGTH,or is determined by the number of bytes remaining in the LAST TD DATA LEN to be transferred, whichever is less. If the frame being transferred is still being received, then the threshold is met when the number of bytes remaining to be transferred is less than or equal to the value of LENGTH LEFT THRESH. In this case, the number of bytes remaining is determined by subtracting the value of LENGTH FIELD from the number of bytes that have been already transferred.

Inputs that are used to compute the XFER COMPLETE THRESHOLD condition may change on different rising edges of CLOCK signal, but they only change on the clock cycle when the CYCLE DONE is asserted. Therefore, in order to accommodate the delays that are contributed by the arithmetic and mux combinatorial logic, the inputs of the flip-flop registers are latched only when CYCLE DONE is asserted.

In particular, registers 330 and 331 along with AND gate 331 are used to assert LENGTH FIELD VALID. Registers 330 and 332 are set by UPLOAD DMA RESET. LENGTH FIELD WR is inputted into the J input of register 330. Registers 330 and 332 are synchronized by the CLOCK signal. TRANSFER LENGTH RD is inputted into the K input of registers 330 and 332. The Q output of register 330 is inputted to AND gate 331 and a CYCLE DONE signal. The output of AND gate 331 is then inputted to the J input register 332 with the Q output of register 332 asserting LENGTH FIELD VALID which is inputted into S0 of MUX 335.

RCV FRAME SIZE [10:0] is inputted to comparator 333 which asserts S1 of MUX 335 if RCV FRAME SIZE [10:0] is greater than 0. Constant 14 is added CONDITIONED LENGTH FIELD [10:0] by logic block 334 which then drives 3 input of MUX 335. 1514 is entered input 2 of MUX 335 with RCV FRAME SIZE [10:0]inputted to 0.1. The Y output of MUX 335 is FRAME length [10:0] which is inputted to subtractor 336. FRAME LENGTH [10:0] is then subtracted from TRANSFER LENGTH [10:0]. The difference is then outputted to the a input of comparator 337 and 1 input of MUX 339. LAST TD DATA LEN selects which value MUX 338 will output from the Y output. UPLOAD BYTE COUNT [10:0] is the 1 input of MUX 338 with 7FF(hex) being the 0 input of MUX 338. The output of MUX 338 is then sent to the b input of comparator 337 and O input of MUX 339. The output of comparator 337 then selects the input of MUX 339.

BYTES REMAIN [10:0] is the Y output of MUX 339 which is inputted to the a input of comparator 341. CUR FRAME IS CUR RCV selects which input of MUX 340 will be selected. LENGTH LEFT THRESH [10:0] is inputted to the 1 input with XFER COMPLETE THRESH [10] inputted to the 0 input. The Y output of MUX 340 is then inputted to the b input of comparator 341. The output of comparator 341 is driven as long as bytes remain [10:0] is greater than or equal to LENGTH LEFT THRESH [10:0] or XFER COMPLETE THRESH [10:0]. The output of comparator 341 is then inputted to AND gate 343 along with XFER LENGTH RD and CYCLE DONE. The output of AND gates 342 and 343 are then entered into OR gate 344. The output of OR gate 344 is then inputted to the D input of register 345 which is set by UPLOAD DMA RESET and synchronized with the CLOCK signal. Register 345 outputs XFER THRESH MET at the Q output with the signal feedback to AND gate 342.

VIII. Conclusion

Therefore, the present invention reduces the number of interrupts to a host system during data block transfers by combining indication signals. The combining of indications is accomplished by indication combination logic which delays a transfer complete interrupt of the transfer of one block of data to occur slightly before the expected occurrence of the ready indication generated by a second block of data to be transferred. The interrupt service routine of the host processor is then able to service the ready indication as well as the transfer complete interrupt without a second interrupt needed to be generated.

In a preferred embodiment, receive threshold logic in a network adapter may be implemented to determine how much of a data frame has been received from a communications network to the network adapter before generating an early receive indication. Moreover, the receive threshold logic includes look-ahead threshold logic and length-left threshold logic. The look-ahead threshold logic generates an EARLY RCV indication when the look-ahead threshold amount of data in the LOOK AHEAD THRESH register is received by the network adapter. The look-ahead value represents the amount of data which has been received.

The network adapter includes indication combination logic which delays XFER COMPLETE to occur slightly before the expected occurrence of the EARLY RCV indication. The indication combination logic generates XFER COMPLETE depending upon whether the transfer threshold amount of data in XFER THRESH REGISTER is met, a current network adapter frame is being received or XFER INDICATION DELAY is met.

The above indication signals are further optimized by allowing the host processor to dynamically tune the timing of the indication signals. The host processor has write access to the threshold registers and may alter threshold values in the threshold registers based on posted status information by the network adapter. The posted status information will allow the host processor to determine whether it is responding too early or too late to an interrupt generated by the indications.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A device for combining indications relating to transfer of data blocks to a destination device, comprising:
   a buffer memory;
   means, coupled to the buffer memory, for receiving the data blocks from a data source, each data block having an amount of data;
   means, coupled to the buffer memory and the destination device, for transferring the data blocks, including a first data block and second data block, from the buffer memory to the destination device;

means, coupled to the buffer memory and the destination device, for generating a first signal near the end of the transfer of the first data clock;

means, coupled to the buffer memory and the destination device, for generating a second signal near the start of the transfer of the second data block; and means, coupled to the means for generating a first signal and the means for generating a second signal, for delaying the first signal for a time interval based upon an expected occurrence of the second signal.

2. The device of claim 1, wherein the device is coupled to a host system and further comprising means for transferring the data blocks includes:

control means, coupled to the means for generating the first signal, for generating an interrupt signal responsive to the first signal and for supplying status information concerning the first and second data blocks which may be sued by the host system.

3. The device of claim 2, wherein the status information includes the first signal and the second signal.

4. The device of claim 1, wherein the means for generating the second signal includes:

a counter, having a counter output and coupled to the buffer memory, for counting the amount of data received by the buffer memory;

a first alterable storage location containing a ready threshold value;

means for comparing the counter output to the ready threshold value in the first alterable storage location and generating the second signal responsive to a comparison of the counter output and the ready threshold value.

5. The device of claim 4, wherein the means for delaying the first signal includes:

a second alterable storage location containing a transfer complete delay threshold value;

an adder, having an adder output and coupled to the counter and the second alterable storage location, for outputting the sum of the values of the counter output and the transfer complete delay threshold value; and a comparator, coupled to the adder output and the first alterable storage location, for indicating the expected occurrence of the second signal responsive to a comparison of the adder output and the ready threshold value.

6. An apparatus for transferring data frames from a network transceiver, coupled with a network, to a host system, comprising:

a buffer memory for storing a data frame;

network interface logic, coupled to the buffer memory and the network transceiver, for transferring a data frame from the network transceiver to the buffer memory;

receive threshold logic, coupled to the network interface logic, for generating an early receive indication signal responsive to transferring a portion of the data frame from the network transceiver to the buffer memory;

host interface logic, coupled to the buffer memory and the host system, for transferring a data frame from the buffer memory to the host system;

transfer complete logic, coupled to the host interface logic, for generating a transfer complete indication signal responsive to transferring a data frame to the host system; and indication combination logic, coupled to the receive threshold logic and the transfer complete logic, for delaying for a period of time the transfer complete indication signal.

7. The apparatus of claim 6, wherein the network interface logic waits an interframe spacing time interval between transferring successive data frames and the period of time occurs during the inter-frame spacing time interval.

8. The apparatus of claim 6, wherein the host interface logic includes:

transfer descriptor logic for mapping transfer descriptors from the host system to the buffer memory, the transfer descriptors identifying locations in host memory to which a data frame in the buffer memory is to be stored; and upload logic, responsive to transfer descriptors in the buffer memory, for transferring a data frame from the buffer memory to host memory.

9. The apparatus of claim 6, wherein the host interface logic includes:

control means for generating an interrupt signal to the host system responsive to the transfer complete indication signal and for supplying status information which may be used by the host system.

10. The apparatus of claim 6, wherein the host system includes host address space, and the buffer memory comprises a buffer independent of the host address space.

11. The apparatus of claim 6, wherein the receive threshold logic includes:

a counter, having a counter output and coupled to the buffer memory, for counting the portion of the data frame transferred to the buffer memory from the network transceiver;

a first alterable storage location containing a receive threshold value;

means for comparing the counter output to the receive threshold value in the first alterable storage location and generating an early receive indication signal responsive to a comparison of the counter output and the receive threshold value.

12. The apparatus of claim 11, wherein the data frame includes a header field, including a destination address, followed by a data field and the receive threshold value is a look-ahead threshold value representing an amount of data relative to the beginning of the header field.

13. The apparatus of claim 12, wherein the network interface logic transfers the destination address from the network transceiver to the buffer memory during the period of time.

14. The apparatus of claim 12, wherein the network interface logic transfers the look-ahead threshold amount of data from the network transceiver to the buffer memory during the period of time.

15. The apparatus of claim 11, wherein the indication combination logic includes:

a second alterable storage location containing a transfer complete delay threshold value;

an adder, having an adder output coupled to the counter and the second alterable storage location, for outputting the sum of the values of the counter output and the transfer complete delay threshold value; and a comparator, coupled to the adder output and the first alterable storage location, for indicating an end of the period of time responsive to a comparison of the adder output and the look-ahead threshold value.

16. An apparatus for receiving a data frame from a network communication media, the apparatus coupled with the network communication media and a host system, the host system including a host processor with an interrupt service routine and host memory, the apparatus comprising:

a buffer memory for storing a data frame;

network interface logic, coupled to the communication media and the buffer memory, for transferring a data frame from the network communication media to the buffer memory;

receive threshold logic, coupled to the network interface logic, for generating an early receive indication signal responsive to transferring a portion of the data frame to the buffer from the network communication media;

host interface logic, coupled to the buffer memory and the host system, for transferring a data frame from the buffer memory to the host system;

transfer complete logic, coupled to the host interface logic, for generating a transfer complete indication signal responsive to transferring a data frame to the host system from the buffer memory;

control means, coupled to host interface logic and the host system, for generating an interrupt signal to the host processor responsive to the early receive signal or transfer complete indication signal and for posting status information representing the early receive and transfer complete indication signals which may be read by the host processor during the interrupt service routine; and indication combination logic, coupled to the receive threshold logic and the transfer complete logic, for delaying for a period of time the generation of the transfer complete indication signal.

17. The apparatus of claim 16, wherein the receive threshold logic includes:

a counter, having a counter output and coupled to the buffer memory, for counting the portion of the data frame transferred to the buffer memory from the network communication media;

a first alterable storage location containing a receive threshold value; and means for comparing the counter output to the receive threshold value in the first alterable storage location and generating an indication signal responsive to a comparison to the counter output and the receive threshold value.

18. The apparatus of claim 17, wherein the data frame includes a header field, including a destination address, followed by a data field and the receive threshold value is a look-ahead threshold value representing an amount of data relative to the beginning of the header field.

19. The apparatus of claim 18, wherein there is an inter-frame spacing time interval between data frames transferred by the network interface logic and the period of time is during the inter-frame spacing time.

20. The apparatus of claim 18, the network interface logic transfers the destination address from the network transceiver to the buffer during the period of time.

21. The apparatus of claim 18, wherein the network interface logic transfers the look-ahead threshold amount of data from the network transceiver to the buffer during the period of time.

22. The apparatus of claim 17, wherein the indication combination logic includes:

a second alterable storage location containing a transfer complete delay threshold value;

an adder, having an adder output and coupled to the counter and the second alterable storage location, for outputting the sum of the values of the counter output and the transfer complete delay threshold value; and a comparator, coupled to the adder output and the first alterable storage location, for indicating an end of the period of time responsive to a comparison of the adder output and the look-ahead threshold value.

23. A network adapter, having a buffer memory, for transferring a data frame from a network transceiver, coupled with a network, to the buffer memory and transferring a data frame from the buffer memory to a host system including a host processor and host memory, the network adapter generating an interrupt signal to the host processor responsive to transferring a data frame, the host processor responding to the interrupt signal and servicing the network adapter during a period of time, the network adapter comprising:

network interface logic, coupled to the buffer memory and the network transceiver, for transferring a data frame from the network transceiver to the buffer memory;

receive threshold logic, coupled to the buffer memory and the network interface logic, for generating an early receive indication signal responsive to transferring the data frame from the network transceiver to the buffer memory, wherein the receive threshold logic includes:

a counter, having a counter output and coupled to the buffer memory, for counting a portion of the data frame transferred to the buffer memory from the network transceiver;

a first alterable storage location containing a receive threshold value; and, means for comparing the counter output to the receive threshold value in the first alterable storage location and generating an indication signal responsive to a comparison to the counter output and the receive threshold value;

host interface logic, coupled to the buffer memory and the host system, for transferring a data frame from the buffer memory to the host system;

transfer complete logic, coupled to the host interface logic, for generating a transfer complete indication signal responsive to transferring a data frame to the host system;

control means, coupled to the host interface logic, for generating an interrupt signal to the host processor responsive to the transfer complete indication signal and posting status information representing the early receive indication signal and transfer complete indication signal which may be read by the host processor; and indication combination logic, coupled to the receive threshold logic and the transfer complete logic, for delaying the transfer complete indication signal such that the early receive indication occurs during the period of time the host processor is servicing the network adapter.

24. The network adapter of claim 23, wherein the data frame includes a header field, including a destination address, followed by a data field and the receive threshold value is a look-ahead threshold value representing an amount of data relative to the beginning of the header field.

25. The network adapter of claim 24, wherein the transfer complete indication signal is generated after the destination address is transferred from the network transceiver to the buffer memory.

26. The network adapter of claim 25, wherein the transfer complete indication signal is generated before the look-ahead threshold value of data is transferred from the network transceiver to the buffer memory.

27. The network adapter of claim 24, wherein the indication combination logic includes:

a second alterable storage location containing a transfer complete delay threshold value;

an adder, having an adder output and coupled to the counter and the second alterable storage location, for outputting the sum of the values of the counter output and the transfer complete delay threshold value; and a comparator, coupled to the adder output and the first alterable storage location, for indicating the expected occurrence of the early receive indication signal responsive to a comparison of the adder output and the look-ahead threshold value.

28. The network adapter of claim 23, wherein the transfer complete indication signal is generated after the portion of the data frame is transferred from the network transceiver to the buffer memory.

* * * * *

UNITED STATES PATENT AND TRADEMARK OFFICE
CERTIFICATE OF CORRECTION

PATENT NO. : 5,319,752
DATED : June 7, 1994
INVENTOR(S) : Petersen et al.

It is certified that error appears in the above-indentified patent and that said Letters Patent is hereby corrected as shown below:

In column 39, line 3, please delete "clock" and insert --block--.

In column 39, line 18, please delete "sued" and insert --used--.

In column 41, line 58, please insert after "claim 18," --wherein--.

Signed and Sealed this

Fifteenth Day of April, 1997

Attest:

BRUCE LEHMAN

Attesting Officer

Commissioner of Patents and Trademarks